United States Patent [19]

Titlow et al.

[11] Patent Number: 5,027,662

[45] Date of Patent: Jul. 2, 1991

[54] ACCURACY MASS FLOW METER WITH ASYMMETRY AND VISCOUS DAMPING COMPENSATION

[75] Inventors: Joseph D. Titlow, Boulder; Paul Z. Kalotay, Lafayette, both of Colo.

[73] Assignee: Micro Motion, Inc., Boulder, Colo.

[21] Appl. No.: 340,678

[22] PCT Filed: Jul. 15, 1988

[86] PCT No.: PCT/US88/02360

§ 371 Date: Feb. 23, 1989

§ 102(e) Date: Feb. 23, 1989

Related U.S. Application Data

[63] Continuation-in-part of Ser. No. 73,709, Jul. 15, 1987, abandoned.

[51] Int. Cl.$^5$ .............................................. G01F 1/84
[52] U.S. Cl. ................................................ 73/861.38
[58] Field of Search ....................... 73/861.38, 861.37; 364/510

[56] References Cited

U.S. PATENT DOCUMENTS

| | | | |
|---|---|---|---|
| Re. 31,450 | 11/1983 | Smith | 73/861.38 |
| 916,780 | 10/1986 | Ruesch . | |
| 916,973 | 10/1986 | Ruesch . | |
| 3,021,481 | 2/1962 | Kalmus et al. | 324/83 |
| 3,527,103 | 9/1970 | Hale et al. | 73/462 |
| 3,579,104 | 5/1971 | Pignard et al. | 324/83 D |
| 3,641,817 | 2/1972 | Dory | 73/194 A |
| 4,095,469 | 6/1978 | Yamada et al. | 73/362 R |
| 4,127,028 | 11/1978 | Cox et al. | 73/194 B |
| 4,246,497 | 1/1981 | Lawson et al. | 307/232 |
| 4,247,819 | 1/1981 | Shimada et al. | 324/233 |
| 4,422,338 | 12/1983 | Smith | 73/861.38 |
| 4,483,202 | 11/1984 | Ogura et al. | 73/861.27 |
| 4,488,108 | 12/1984 | Treise et al. | 324/83 D |
| 4,491,009 | 1/1985 | Ruesch | 73/32 A |
| 4,491,025 | 1/1985 | Smith et al. | 73/861.38 |
| 4,559,833 | 12/1985 | Sipin | 73/861.38 |
| 4,581,595 | 4/1986 | Silagi | 333/139 |
| 4,622,858 | 11/1986 | Mizerak | 73/861.38 |
| 4,660,421 | 4/1987 | Dahlin et al. | 73/861.38 |
| 4,675,614 | 6/1987 | Gehrke | 328/133 |

FOREIGN PATENT DOCUMENTS

| | | |
|---|---|---|
| 0109218 | 5/1984 | European Pat. Off. . |
| 0253504 | 1/1988 | European Pat. Off. . |
| 8505677 | 12/1985 | World Int. Prop. O. . |
| 8500699 | 1/1986 | World Int. Prop. O. . |

OTHER PUBLICATIONS

Furness, Dr. R. A.; "Coriolis Mass Meter Experience", Preprint of Presentation given at Stavenger, Norway for North Sea Meter Workshop; (Oct. 13, 1987).

Walewski, Kendrick; "Position Detection Device Using Amplitude Modulation"; IBM Technical Disclosure Bulletin; vol. 14, No. 7, (Dec. 1971).

Dranetz Engineering Laboratory; "Applications Handbook of Precision Phase Measurennt"; (1975).

Hilton and Scott; "Time Interval Measurements with the —hp— Electronic Counter"; *Hewlett-Packard Journal;* (Sep.-Oct. 1953).

Sipin, "Vibratory Sewer Flow Meter"; Prepared for the Environmental Protection Agency; Contract 14-1-2-907; (Mar. 15, 1972).

Heydeman; "On the Precise Measurment of Phase Angles"; *Acustica;* vol. 13 (1963).

McKinney; "Digitized Low-Frequency Phasemeter Assembled from Logic Modules"; Journal of Research of the National Bureau of Standards; vol. 71C, No. 3; (Jul.-Sep. 1967).

*Primary Examiner*—Herbert Goldstein

[57] ABSTRACT

An improved accuracy Coriolis mass flow meter. Signal processing embodiments provide improved accuracy by accounting for the non-linear relationship between phase angle difference of motion sensor signals and mass flow rate. Compensation is made for asymmetric and viscous damping effects, as well.

21 Claims, 12 Drawing Sheets

ACCURACY MASS FLOW METER WITH ASYMMETRY AND VISCOUS DAMPING COMPENSATION

This application is a continuation-in-part of United States patent application Ser. No. 073,709, filed July 15, 1987, now abandoned.

TECHNICAL FIELD

The present invention relates to Coriolis mass flow rate meters that include one or more flow conduits which are driven to oscillate at the resonant frequency associated with the combined mass of the flow conduit and the fluid flowing therethrough. The drive frequency is maintained at resonance by a feedback system, which detects a change in the resonant behavior of the fluid-filled conduit as a result of the fluid mass change due to the change in fluid density. The flow conduits used in these Coriolis mass flow rate meters are mounted so they can oscillate at the resonant frequency associated with the oscillation axis about which externally applied forces act to oscillate each flow conduit. The flow conduit also deforms about another axis which is associated with deflections of each flow conduit caused by Coriolis forces arising from the combination of the driven oscillation and flow of fluids through the flow conduit. The axis associated with Coriolis deflections is substantially transverse to the oscillation axis. According to the present invention greater accuracy of measurement at high flow rates is obtained in flow meter designs which employ signal processing which includes a non-linear phase angle difference relationship between the signals of motion sensors mounted on or adjacent the flow conduit. The present invention also accounts for asymmetries in flow conduit deflections and for viscous damping in the flow conduits due to properties of the flow conduit materials and the flow of fluids through the conduits.

BACKGROUND ART

In the art of measuring mass flow rates of flowing substances it is known that flowing a fluid through an oscillating flow conduit induces Coriolis forces to act on the conduit. It is also known that the magnitudes of such Coriolis forces are related to both the mass flow rate of the fluid passing through the conduit and the angular velocity at which the conduit is oscillated.

One of the major technical problems previously associated with efforts to design and make Coriolis mass flow rate instruments was the necessity either to measure accurately or control precisely the angular velocity of an oscillated flow conduit so that the mass flow rate of the fluid flowing through the flow conduits could be calculated using measurements of effects caused by Coriolis forces. Even if the angular velocity of a flow conduit could be accurately determined or controlled, precise measurement of the magnitude of effects caused by Coriolis forces was another severe technical problem. This problem arises in part because the magnitudes of generated Coriolis forces are very small in comparison to other forces such as inertia and damping, therefore resulting Coriolis force-induced effects are minute. Further, because of the small magnitude of the Coriolis forces, effects resulting from external sources such as vibrations induced, for example, by neighboring machinery or pressure surges in fluid lines, may cause erroneous determinations of mass flow rates. Such error sources as discontinuities in the flow tube may even completely mask the effects caused by generated Coriolis forces rendering a flow meter useless.

A mechanical structure and measurement technique which, among other advantages: (a) avoids the need to measure or control the magnitude of the angular velocity of a Coriolis mass flow rate instrument's oscillating flow conduit; (b) concurrently provides requisite sensitivity and accuracy for the measurement of effects caused by Coriolis forces; and, (c) minimizes susceptibility to errors resulting from external vibration sources, is taught in U.S. Pat. Nos. Re 31,450, entitled "Method and Structure for Flow Measurement" and issued Nov. 29, 1983; U.S. Pat. No. 4,422,338 entitled "Method and Apparatus for Mass Flow Measurement" and issued Dec. 27, 1983; and U.S. Pat. No. 4,491,025 entitled "Parallel Path Coriolis Mass Flow Rate Meter" and issued Jan. 1, 1985. The mechanical arrangements disclosed in these patents incorporate flow conduits having no pressure sensitive joints or sections, such as bellows or other pressure deformable portions. These flow conduits are solidly mounted in a cantilevered fashion from their inlet and outlet ports. For example, in U.S. Pat. No. 4,491,025 but not limited thereto, the flow conduits can be welded or brazed to a support, so they can be oscillated in spring-like fashion about axes which are located near the solidly mounted sections of the flow conduits. Additionally these solidly mounted flow conduits are preferably designed so they have resonant frequencies about the axes located near the mountings which are lower than the resonant frequencies about the axes relative to which Coriolis forces act. By so designing the flow conduits, a mechanical situation arises whereby, under flow conditions, the forces opposing generated Coriolis forces are essentially linear spring forces. The Coriolis forces, opposed by essentially linear spring forces, deflect the flow conduit containing flowing fluid about axes located between and essentially equidistant from the portions of the flow conduits in which Coriolis forces are generated. The magnitudes of the deflections are a function of the magnitudes of the generated Coriolis forces and the linear spring forces opposing the generated Coriolis forces.

As stated above, the flow conduits, in addition to being deflected by the Coriolis forces, are also driven to oscillate. Accordingly, under flow conditions, one portion of each flow conduit on which the Coriolis forces act will be deflected so as to move ahead, in the direction in which the flow conduit is moving, of the other portion of the flow conduit on which Coriolis forces are acting. The time or phase relationship between when the first portion of the oscillating flow conduit deflected by Coriolis forces has passed a preselected point on the path of oscillation for the flow conduit to the instant when the second portion passes a corresponding preselected point is a function of the mass flow rate of the fluid passing through the flow conduit.

A number of other Coriolis mass flow meters have been developed which are governed by similar equations of motion. Among these are specific embodiments disclosed in U.S. Pat. No. 4,127,028 (Cox et al., 1978), U.S. Pat. No. 4,559,833 (Sipin, 1985), U.S. Pat. No. 4,622,858 (Mizerak, 1986), PCT Application No. PCT/US85/01046 (Dahlin, filed 1985) and U.S. Pat. No. 4,660,421 (Dahlin, et al., 1987).

Prior art mass flow meters have been limited in their accuracy by the method of processing motion sensor signals and the relationship used in such processing.

This limitation becomes important for phase angle differences above the range of 3 to 4 degrees (0.0524 to 0.0698 radians). The three Smith patents named above employ a linear relationship between the time difference of two portions of the flow conduit passing through a preselected point and mass flow rate. This time difference measurement may be made by optical sensors as specifically exemplified in U.S. Pat. No. Re 31,450, electromagnetic velocity sensors as specifically exemplified in U.S. Pat. Nos. 4,422,338 and 4,491,025, or position or acceleration sensors as also disclosed in U.S. Pat. No. 4,422,338.

A double flow conduit embodiment with sensors for making the preferred time measurements is described in U.S. Pat. No. 4,491,025. The double flow conduit embodiment described in U.S. Pat. No. 4,491,025 provides a Coriolis mass flow rate meter structure which is operated in a tuning fork-like manner as is also described in U.S. Pat. No. Re 31,450. The tuning fork operation contributes to minimizing effects of external vibration forces. Minimizing effects of external vibration forces is important because these forces can induce errors in the required time measurement.

The approach which has been taken in the prior art has been to assume that flow conduits exhibit symmetric behavior in the deformations about the Coriolis axis transverse to the oscillation axis. This is because an assumed absence of damping permits each portion of the flow conduit to respond essentially identically to the forces acting on the tube as would portions located symmetrically about the transverse axis. As one skilled in the art will recognize from the disclosures herein, a general solution to phase angle difference equations, assuming no asymmetric behavior of the flow conduit, yields the following expression for mass flow:

$$m_o = -\left(\frac{\sqrt{2}\,f_b}{2c_b u_d}\right) k_c \frac{\sqrt{(\omega_c^2 - \omega_d^2)^2 + (2\omega_c\omega_d\zeta_c)^2}}{\omega_c^2} \times \frac{\sin(\delta\theta/2)}{\omega_d\sqrt{1 + \cos(2\phi_c)\cos(\delta\theta)}} \quad (1)$$

where the meaning of the variables and parameters for this and all subsequent equations is given in Table 1, herein.

The mass flow rate measurement scheme embodied in eq. (1) is identical with previously published schemes, e.g. U.S. Pat. No. Re 31,450. The correspondence can be shown by eliminating some of the additional considerations of this analysis.

Assume the phase angle difference $\delta\theta$ is sufficiently small that $$\sin(\delta\theta/2) \approx \delta\theta/2 \quad (2)$$

$$\cos(\delta\theta) \approx 1 \quad (3)$$

As shown herein, the phase angle difference and time delay $\delta t$ are related by $$\delta\theta = \omega_d \delta t \quad (4)$$

where $$\delta t = t_r - t_l \quad (5)$$

Using eqs. (2) and (3) together with eq. (4) in eq. (1) gives $$m_o = -\left(\frac{\sqrt{2}\,f_b}{4c_b u_d}\right) k_c \frac{\sqrt{(\omega_c^2 - \omega_d^2)^2 + (2\omega_c\omega_d\zeta_c)^2}}{\omega_c^2} \times \frac{\delta t}{\sqrt{1 + \cos(2\phi_c)}} \quad (6)$$

Thus, when the phase angle difference is small, which is typically true for phase angle differences below 3 to 4 degrees, the general solution to the phase angle difference equations reduces to a time delay mass flow measurement scheme. The simple change of variables from time to phase angle (eq. 50, herein) does not alter the physics of the mass flow measurement scheme. Taking account of the nonlinear phase angle difference relationship for phase angle differences above 3 to 4 degrees, does, however, increase the range of mass flow rate measurement accuracy.

If the viscous damping associated with the Coriolis motions of the flow tube is sufficiently small, it can be neglected. The critical damping ratio $\zeta_c$ is set to zero in eq. (6) resulting in $$\phi_c = 0 \quad (7)$$

$$m_o = -\left(\frac{f_b}{4c_b u_d}\right) k_c [1 - (\omega_d/\omega_c)^2]\delta t \quad (8)$$

As before, the first term in the parentheses is a constant, as is the spring constant $k_c$. Equation (8) states that when damping can be neglected, the mass flow rate scheme developed from the phase angle difference equations is identical to a constant times the frequency response term times the time delay.

It is assumed that the combined inertia of the flow tube, appendages, and fluid is sufficiently low that it can be neglected. As one skilled in the art will recognize, as the mass becomes smaller, the natural frequency $\omega_c$ increases. In the limit, as m goes to zero, $\omega_c$ tends to infinity, such that the frequency response term in eq. (8) approaches unity. Thus, when inertia is neglected, the mass flow rate measurement scheme based on the phase angle difference equations reduces to $$m_o = -\left(\frac{f_b}{4c_b u_d}\right) k_c \delta t \quad (9)$$

Equation (9) is identical in form to the mass flow rate equation of U.S. Pat. No. Re 31,450. This equation can be presented as a phase angle difference equation by substituting the expression $$\delta t = \frac{\delta\theta}{\omega_d} \quad (10)$$

The non-linear relationship employed in the Dahlin PCT Appln. No. PCT/US85/01046 is reached by employing mutually contradictory assumptions of the existence of damping and the lack of damping to develop the underlying zero crossing equations and their solutions. In addition, asymmetric effects are ignored. This results in two equations in the solution which are reduced to a single solution by assuming zero damping. The Dahlin non-linear relationship can be reached by one skilled in the art by employing the following phase angle difference equations based on a lumped parameter model shown in FIG. 2, herein:

$$\left(\frac{f_b}{\omega_d c_b}\right)\sin(\delta\theta/2) + H_c \cos(\delta\theta/2 - \phi_c) = 0 \quad (11)$$

$$\left(\frac{f_b}{\omega_d c_b}\right)\sin(\delta\theta/2) + H_c \cos(\delta\theta/2 + \phi_c) = 0 \quad (12)$$

If electronics are coupled to the outputs of velocity sensors such that the phase angle difference $\delta\theta$ is measured, then at a zero crossing either eq. (11) or (12) presented herein can be solved for the amplitude function $H_c$. Well-known mathematical identities can be used to expand eq. (12), and then dividing by $\cos(\delta\theta/2)$, which never is zero for realistic $\delta\theta$, the following expression for $H_c$ results:

$$H_c = -\left(\frac{f_b}{c_b}\right)\frac{\tan(\delta\theta/2)}{\omega_d(\cos\phi_c - \sin\phi_c \tan(\delta\theta/2))} \quad (13)$$

However, $H_c$ is related to the mass flow rate through eq. (37), presented herein. Setting eq. (13) equal to eq. (37) and solving for the mass flow rate yields $$\dot{m}_o = -\left(\frac{f_b}{2c_b u_d}\right)k_c \frac{\sqrt{(\omega_c^2 - \omega_d^2)^2 + (2\omega_c\omega_d \zeta_c)^2}}{\omega_c^2} \times \frac{\tan(\delta\theta/2)}{\omega_d(\cos\phi_c - \sin\phi_c \tan(\delta\theta/2))} \quad (14)$$

An alternate form for eq. (14) is obtained by setting $$\phi = \frac{\pi}{2} - \phi_c \quad (15)$$

Substituting eq. (15) into eq. (14) and using well-known mathematical identities yields $$\dot{m}_o = -\left(\frac{f_b}{2c_b u_d}\right)k_c \frac{\sqrt{(\omega_c^2 - \omega_d^2)^2 + (2\omega_c\omega_d \zeta_c)^2}}{\omega_c^2} \times \frac{\tan(\delta\theta/2)}{\omega_d[\sin\phi - \cos\phi \tan(\delta\theta/2)]} \quad (16)$$

Equation (16) is the mass flow measurement scheme given by PCT Appln. No. PCT/US85/01046. Note that the first term in parentheses is a non-dimensional constant, since it is assumed that the ratio $f_b/u_d$ is constant for any particular driver design. Also note that eq. (16) shows how the measurement of mass flow rate depends on the frequency response of the flow tube.

Equation (16) is not the only mass flow measurement scheme that can be generated from the phase angle difference equations (11) and (12). Equation (16) resulted from manipulations on eq. (12) only. The same procedures applied to eq. 11) yields $$\dot{m}_o = -\left(\frac{f_b}{2c_b u_d}\right)k_c \frac{\sqrt{(\omega_c^2 - \omega_d^2)^2 + (2\omega_c\omega_d \zeta_c)^2}}{\omega_c^2} \times \frac{\tan(\delta\theta/2)}{\omega_d[\sin\phi + \cos\phi \tan(\delta\theta/2)]} \quad (17)$$

Note that eq. (17) is identical with eq. (16) except that the sign of the last term in the denominator has changed. This is a contradiction, and at least one of the mass flow measurement schemes embodied in these equations (16) and (17) must be incorrect. The contradiction is removed for the case of zero damping. Equation (36) indicates that $\phi_c$ is zero when $\zeta_c$ is zero. By eq. (15), the phase angle becomes $\pi/2$. Making this substitution in eqs. (16) and (17) makes them identical.

If the simplifications are made in eqs. (16) and (17) that were made to the general solution, eq. (1), then the result is the linearized formula of eq. (9).

The source of the error with the PCT Appln. No. PCT/US85/01046 approach is that the solution is not unique. There the mass flow equation is contradicted by a companion equation developed by identical methods. As explained above, both equations cannot be correct in the general case. For the special case of no damping in the Coriolis motions, the two equations (16) and (17) become identical, but this violates the assumption of non-zero damping used throughout PCT Appln. No. PCT/US85/01046. The new solution of the phase angle difference equations given by equation (71) disclosed herein overcomes this contradiction.

Prior mass flow measurement schemes have employed assumptions which are limited in their appropriateness to the materials of which the flow conduit is made. Both U.S. Pat. No. Re 31,450 and PCT Appln. No. PCT/US85/01046 ignore the asymmetry considerations disclosed herein, to assume that the time or phase angle difference between the motion of one portion of the flow conduit and the locus of the intersection of the conduit with a plane bisecting the conduit into two equal portions is equal to the time or phase angle difference between the motion of an opposed symmetrically-located portion of the flow conduit and the same locus. The damping of the mechanical system influences the degree of asymmetry, however. For systems having little damping, such as when the flow tubes are made from metal tubing, the amount of asymmetry is too small to measure (on the order of a few millionths of a degree). For these cases, it is appropriate to assume symmetry of the motion sensor signals with respect to the driver signal. If non-metallic tubes are used, however, it is expected that the inherent damping of such materials would create an amount of asymmetry large enough to measure, and hence of sufficient magnitude for correction in the mass flow rate determination. Suitable non-metallic materials include, but are by no means limited to, high-temperature glass, such as PYREX, manufactured by the Corning Glass Company, high-temperature ceramics, or fiber-reinforced high mechanical strength, temperature-resistant plastics. Additionally, the flowing fluids through flow conduits produce viscous damping which can be accounted for by appropriate modeling, as described herein. This modeling, which employs lumped parameters, accounts for both the damping due to the flow conduit properties and the damping due to the flow of fluids through the conduits.

Prior art mass flow devices have permitted the determination of fluid density. See, for example, U.S. Pat. Nos. Re 31,450, and 4,491,009 Which disclose such a density determination. Specific density meter circuitry embodiments are disclosed by Ruesch in U.S. patent application Nos. 916,973 and 916,780, both filed Oct. 9, 1986. These circuits can be employed with the embodiments disclosed herein to determine density as well as mass flow rate.

DISCLOSURE OF INVENTION

Several embodiments of Coriolis mass flow meters are disclosed which incorporate logic to process motion sensor signals to determine the frequency at which the flow conduit is driven, a frequency response function, a half-angle tangent function, and a temperature-compensated spring constant. These processed signals are further processed with calibration constants to provide a measurement of mass flow rate. In a preferred embodiment, signals are processed from two motion sensors which are positioned to monitor two points on a flow conduit essentially equidistant from the center or midpoint of the conduit, which is assumed to be symmetrical The signal from one motion sensor is processed by a logic element to provide a measurement of the drive frequency at which the flow conduit is oscillated. The signal is further processed by a logic element to provide a frequency response function. The signal from a second motion sensor is compared with the signal from the first motion sensor in a phase angle difference logic element to produce a phase angle difference measurement. The phase angle difference of the signals at their respective zero-crossings is used. This phase angle difference measurement is then processed further by a half-angle tangent function logic element to produce a half-angle tangent function. A signal from a temperature sensor which monitors flow conduit temperature is processed by a temperature compensation logic element to provide a temperature-compensated flow conduit spring constant. The resultant frequency response function, half-angle tangent function and temperature-compensated spring constant are then combined with various known calibration constants in a mathematics logic element. This mathematics logic element combines the various processed signals to produce a measurement of mass flow rate.

For the case in which there is significant asymmetric behavior of the flow conduit under flow conditions, two other preferred mass flow meter embodiments are disclosed which incorporate logic elements which similarly process motion sensor signals for the flow conduit motion and driver motion to produce a conduit drive frequency, a frequency response function, a half-angle tangent function and a temperature-compensated flow conduit spring constant along with calibration constants to produce mass flow rate.

Finally, three embodiments which account for both asymmetric behavior and viscous damping are disclosed. These embodiments incorporate logic elements which similarly process motion sensor signals for the flow conduit and driver motion to produce a conduit drive frequency, a frequency response function, a temperature-compensated flow conduit spring constant, calibration constants, along with trigonometric logic elements which produce either a half-angle tangent function or another trigonometric function. Viscous damping is accounted for by a damping measurement logic element. One of these embodiments employs the use of two flow conduit motion sensor signals.

Several techniques are known in the prior art for making damping measurements. For many applications the damping is constant, and very accurate modal analysis techniques can be employed. For example, the Modal 3.0 software produced by Structural Measurement Systems, Inc. of San Jose, Calif. has been used to measure the damping ratios of mass flow meters.

When the damping is not constant, a near continuous signal must be supplied. One technique is to monitor the power delivered by the drive system. This quantity is directly proportional to the damping in the system. Small changes in the drive frequency could also be used to make damping measurements. Another approach is to use standard decay techniques, such as described in the "Shock and Vibration Handbook", second edition, 1976, published by McGraw Hill Book Company. The measurement could be made on an intermittent basis so as not to interfere with the mass flow measurement.

The advantages of the embodiments disclosed herein are at least fourfold: (1) accuracy is preserved at high flow rates; (2) account can be taken for asymmetries between the motion sensor signals; (3) accurate mass flow measurement is permitted for higher signal-to-noise ratios; and (4) viscous damping is accounted for in three of the embodiments.

BEST MODE FOR CARRYING OUT THE INVENTION

A. Signal Processing Application

Figure 1:
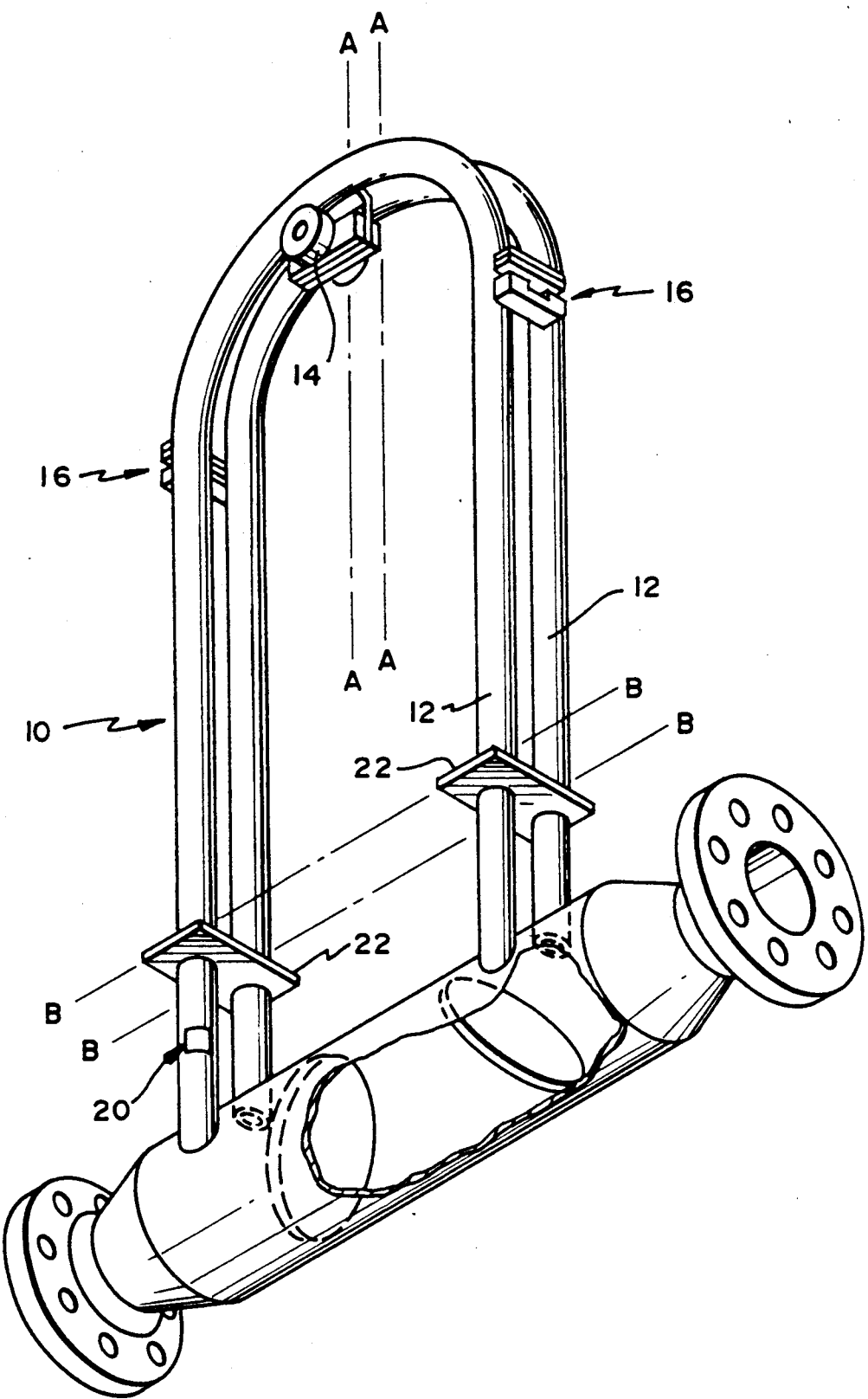
FIG. 1 is a perspective view of an oscillating parallel path flow meter with both motion and temperature sensors mounted on oscillating tubes.

A Coriolis mass flow rate meter, as generally designated by numeral 10, for which the present invention can be used, is shown in FIG. 1. The flow meter 10 incorporates twin flow conduits 12. The flow conduits 12 are solidly mounted to the supports 22, with the conduits being free of pressure-sensitive joints. Other arrangements utilizing a single flow conduit and a spring arm, or a single light weight flow conduit solidly mounted to a relatively massive support can also be used with the present invention. In addition, the invention herein is applicable to various shapes and configurations in which Coriolis force couples are generated by fluids flowing through solidly mounted oscillated flow conduits. This includes various full and partial loop shapes, S-shapes, B-shapes and straight tubes. As one skilled in the art will recognize, tube shape is not a limitation of the current invention. The flow meter 10, in addition to the flow conduits 12, includes a driver 14, such as a permanent magnet and wire coil combination as is known in the art, to oscillate the flow conduits 12 about axes B—B essentially 180 degrees out of phase with one another as the prongs of a tuning fork. The flow meter 10 further includes sensors 16 mounted on the flow conduits 12. The sensors 16 shown in FIG. 1 are velocity sensors which continuously provide signals linearly representative of the actual movement of the flow conduits 12 over their entire path of motion. When the flow conduits 12 are oscillating and fluid is flowing through them, the flow conduits 12 are deflected about axes A—A by Coriolis forces. The effects of these deflections are monitored by the sensors 16. A detailed description of the mechanical operation of flow meter 10 is set forth in the aforementioned U.S. Pat. Nos.: U.S. Pat. No. Re 31,450, 4,422,338 and 4,491,025.

Flow conduit temperature is monitored by temperature sensor 20, which is mounted on the flow conduit where flow is incoming. Temperature sensor 20 may be a resistance temperature device (RTD), a thermocouple or other temperature measurement device known in the art.

The sensors 16 are electromagnetic velocity sensors. Each sensor, 16, consists of a permanent magnet and a coil, with the coil designed so as always to be moved within the essentially uniform magnetic field of the magnet. Descriptions of the operation of sensors 16 for single and twin conduit Coriolis mass flow rate meters are set forth in the aforementioned U.S. Pat. Nos.: 4,422,338 and 4,491,025.

The invention disclosed herein relates to the processing of motion sensor signals and a driver motion signal to determine accurately the mass flow rate of fluids passing through oscillated conduits. The flow conduits can be curved or straight and/or single or multiple. Motion sensor signals and driver motion signals are employed in various combinations to produce phase angle differences between the signals. The key feature is that the Coriolis forces produced by the combination of oscillation and flow yield a net phase angle difference which is related to mass flow rate.

The motion sensing transducers may be position or displacement, velocity or acceleration. In what follows, however, velocity sensors are discussed. This does not limit the use of other motion sensors. The primary requirements for the motion sensors are that their output signals have different phases as a result of the deformation of the flow conduit due to Coriolis force and that their output signals be linearly representative of the whole range of adjacent conduit motion. The driver yields a periodic, preferably sinusoidal signal. Other periodic wave forms can be used, but they have an increased harmonic content.

THEORY OF OPERATION

Figure 2:
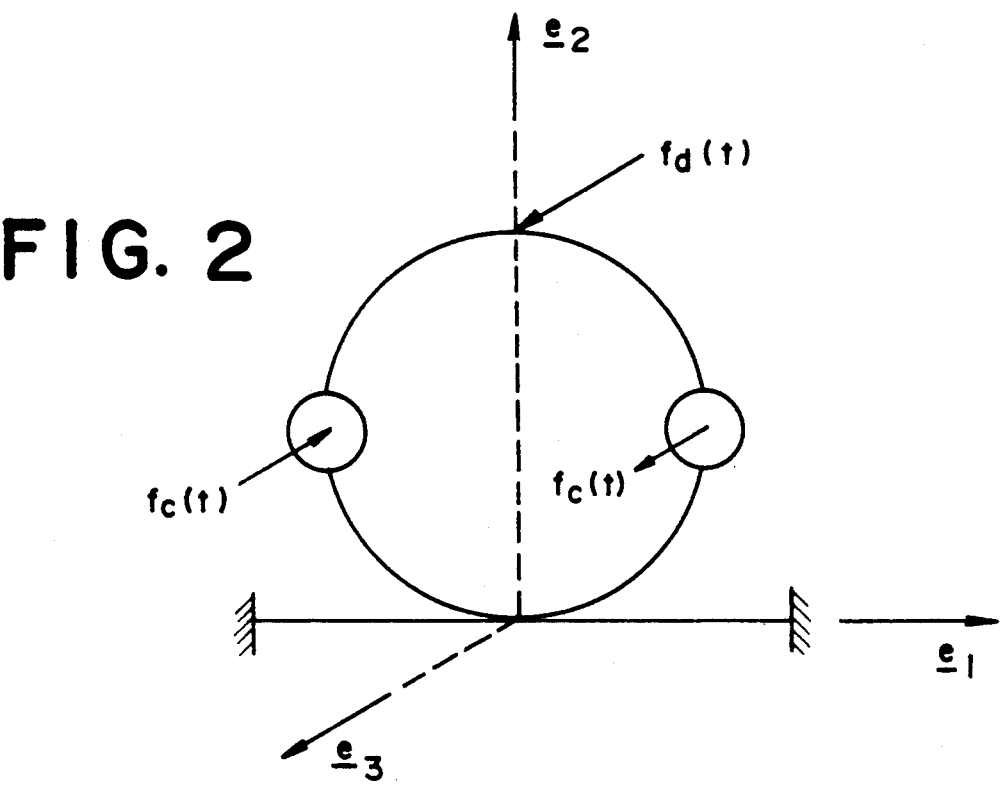
FIG. 2 is a diagram which illustrates idealized geometry of a lumped parameter, single tube mass flow meter.

FIG. 2 depicts a single loop flow meter idealized as a lumped parameter mass flow meter. The flow meter is modeled as two uncoupled masses with lumped elastic and damping characteristics. The model is based on an approach developed by Dahlin (1985, "Apparatus for Mass Flow Rate and Density Measurement," Patent Cooperation Treaty Application Number PCT/US85/01046). The flow tube is fixed at each end along the $e_1$ axis of an inertial reference frame having mutually orthogonal axes $e_1$, $e_2$, and $e_3$. The flow tube is symmetric about the $e_2$ axis and lies entirely in the $e_1$ - $e_2$ plane. The elastic, damping and inertial properties of the flow tube are lumped at points on both the right and left sides of the flow tube as shown. Hence, in the discussion that follows, the subscripts "r" and "l" will be used to designate right and left. Of course, other orientations of the flow conduit are contemplated. For example, a U-tube is obtained from the geometry of FIG. 2 by straightening the inlet and outlet flow tubes such that they are tangent to the upper curve. A sinusoidal drive force, $f_d(t)$, is applied at the top of the loop in transverse direction $e_3$. Coriolis forces, $f_c(t)$, are illustrated acting on the two lumped mass points. The analysis as presented herein is directed to curved tubes for the sake of simplicity. However, the equations of motion are applicable to any flow conduit configuration for which Coriolis force couples are generated by flow through an oscillated conduit. FIG. 2 illustrates a curved conduit. As one skilled in the art will recognize, because the equations of motion are the same, the model derived is applicable to straight tubes as well as curved tubes.

Figure 3:
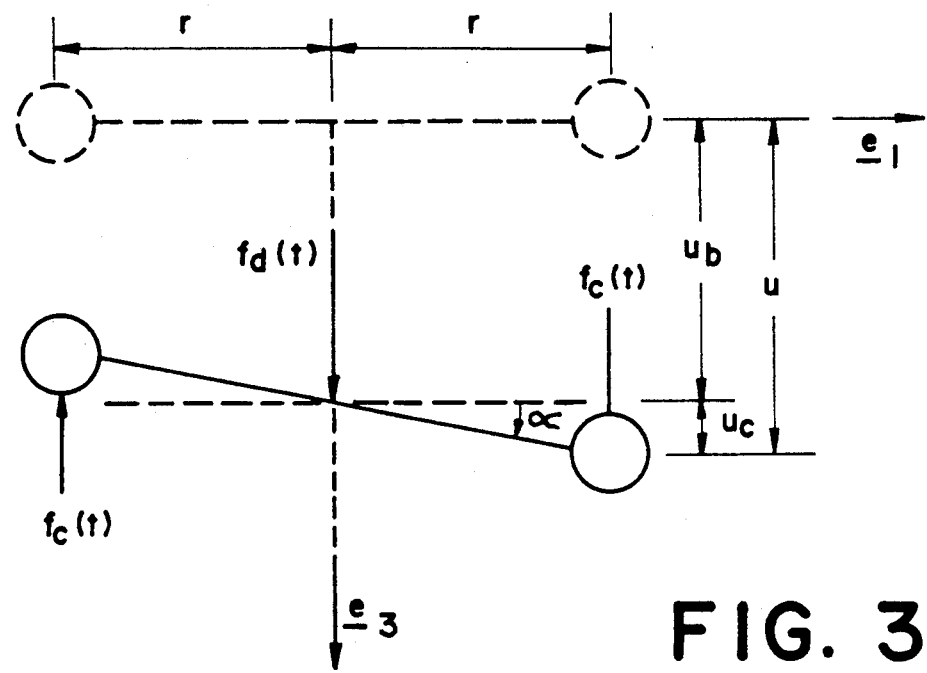
FIG. 3 is a diagram which illustrates the geometric relationship of the superposition of bending and Coriolis motions of a lumped parameter mass flow meter.

FIG. 3 illustrates the characteristic motion of the idealized system of FIG. 2. As shown in FIG. 3, the flow conduit undergoes a displacement, u, along the $e_3$ axis which has two components. The displacement component $u_b$ is the bending displacement along $e_3$ that results from the drive force $f_d(t)$. The displacement component $u_c$ is the Coriolis displacement along $e_3$. The total displacement is given by superposition of the solutions to the equations of motion for bending and Coriolis forces.

In the discussion which follows, the symbols used and their definitions are given in Table 1.

TABLE 1

System Parameters and Variables

| Symbol | Description | English Units | SI Units |
|---|---|---|---|
| $\dot{m}_o$ | mass flow rate | $lb_m$/min | kg/min |
| m | mass of fluid-filled flow tube | $lb_m$ | kg |
| $f_b$ | drive force | $lb_f$ | N |
| $f_c$ | Coriolis force | $lb_f$ | N |
| $f_o$ | viscous damping force | $lb_f$ | N |
| $c_b$ | bending damping constant | $lb_f$-sec/in | N-sec/cm |
| $c_c$ | Coriolis damping constant | $lb_f$-sec/in | N-sec/cm |
| u | displacement | in | cm |
| $u_b$ | bending displacement | in | cm |
| $u_c$ | Coriolis displacement | in | cm |
| $u_d$ | drive displacement | in | cm |
| $u_l$ | left mass displacement | in | cm |
| $u_r$ | right mass displacement | in | cm |
| $\dot{u}_b$ | bending velocity | in/sec | cm/sec |
| $\dot{u}_c$ | Coriolis velocity | in/sec | cm/sec |
| $\dot{u}_d$ | drive velocity | in/sec | cm/sec |
| $\dot{u}_l$ | left mass velocity | in/sec | cm/sec |
| $\dot{u}_r$ | right mass velocity | in/sec | cm/sec |
| $\ddot{u}_b$ | bending acceleration | in/sec² | cm/sec² |
| $\ddot{u}_c$ | Coriolis acceleration | in/sec² | cm/sec² |
| $\omega$ | angular velocity | hz | hz |
| $\omega_b$ | natural frequency (bending) | hz | hz |
| $\omega_c$ | natural frequency (Coriolis) | hz | hz |
| $\omega_d$ | drive frequency | hz | hz |
| $\theta$ | phase angle | radians | radians |
| $\theta_r$ | phase angle (right mass) | radians | radians |
| $\theta_l$ | phase angle (left mass) | radians | radians |
| $\delta\theta$ | phase angle difference | radians | radians |
| $\delta\theta_r$ | phase angle difference (right mass) | radians | radians |
| $\delta\theta_l$ | phase angle difference (left mass) | radians | radians |
| t | time | sec | sec |
| $\delta\theta^o$ | phase angle difference (undamped) | radians | radians |
| $t_r$ | time (right mass) | sec | sec |
| $t_l$ | time (left mass) | sec | sec |
| $\delta t$ | time delay | sec | sec |
| $\alpha$ | rotation | radians | radians |
| r | moment arm | in | cm |
| $\dot{\alpha}$ | rotational velocity | radians/sec | radians/sec |
| $\ddot{\alpha}$ | rotational acceleration | radians/sec² | radians/sec² |
| $M_e$ | elastic restoring moment | in-$lb_f$ | N-cm |
| $M_v$ | viscous damping moment | in-$lb_f$ | N-cm |
| $I_c$ | moment of inertia | $lb_m$-in² | kg-cm² |
| $\phi$ | phase angle function | radians | radians |
| $\phi_b$ | bending phase angle function | radians | radians |
| $\phi_c$ | Coriolis phase angle function | radians | radians |
| $H_b$ | bending amplitude | in | cm |
| $H_c$ | Coriolis amplitude | in | cm |
| $\zeta_b$ | bending damping ratio | % | % |
| $\zeta_c$ | Coriolis damping ratio | % | % |
| $k_b$ | bending elastic spring constant | $lb_f$/in | N/cm |
| $k_c$ | Coriolis elastic spring constant | $lb_f$/in | N/cm |
| $\epsilon$ | phase angle lag | radians | radians |
| $\theta_d$ | driver phase angle | radians | radians |
| $\rho$ | fluid density | $lb_m$/ft³ | kg/m³ |
| P | oscillation period | sec | sec |
| $m_T$ | conduit and appendage mass | $lb_m$ | kg |
| $m_F$ | fluid mass | $lb_m$ | kg |
| $V_o$ | conduit volume | cu. ft. | m³ |

The equation of motion for the bending motion due to the driver force is $$\ddot{u}_b + 2\omega_b \zeta_b \dot{u}_b + \omega_b^2 u_b = \frac{f_b}{m} \sin \omega_d t \quad (18)$$

where $$\omega_b^2 = \frac{k_b}{m} \quad (19)$$

$$\zeta_b = \frac{c_b}{2\sqrt{(k_b m)}} \quad (20)$$

The steady-state solution for the idealized bending motion of the flow tube is $$u_b(t) = H_b \sin(\omega_d t - \phi_b) \quad (21)$$

where $H_b$ is the amplitude function and $\phi_b$ is the phase angle function. These functions are given by $$H_b = \left(\frac{f_b}{k_b}\right)\left(\frac{\omega_b^2}{\sqrt{(\omega_b^2 - \omega_d^2)^2 + (2\omega_d \omega_b \zeta_b)^2}}\right) \quad (22)$$

$$\phi_b = \tan^{-1}\left(\frac{2\omega_b \omega_d \zeta_b}{(\omega_b^2 - \omega_d^2)}\right) \quad (23)$$

By similar means, a second equation of motion is obtained for the case when fluid of constant density flows through the tube at constant speed. FIG. 3 shows the geometry of the situation. At time t, the idealized masses have been displaced an amount $u_b(t)$ due to the driver. In addition, the flowing fluid gives rise to a Coriolis force $f_c(t)$ acting on each mass of the form $$f_c(t) = 2\dot{m}_o \dot{u}_d \sin \omega_d t \quad (24)$$

where $\dot{m}_o$ is the constant mass flow rate, and $\dot{u}_d$ is the amplitude of the driver velocity, which is also assumed constant. Due to the curvature of the flow tube, the Coriolis force on the left mass is 180 degrees out of phase with the Coriolis force acting on the right mass. The net result is that the flowing fluid produces a pure moment causing the rotation $\alpha$ of the masses about the $e_2$ axis which is out of the $e_1$-$e_3$ plane as shown in FIG. 3.

Since all displacements are small, it is assumed that the resulting torsional motions induced by the flowing fluid can be superposed on the bending motions by neglecting any coupling between the degrees of freedom. The equation of motion for the uncoupled torsional motions is obtained as follows. An elastic restoring moment $M_e$ is assumed to act on each mass of the form $$M_e = -rk_c(r\alpha) \quad (25)$$

where $k_c$ is the elastic spring constant for this degree of freedom and r is the distance between the $e_2$ axis and the mass point. A viscous damping moment is also assumed of the form $$M_v = -rc_c(r\dot{\alpha}) \quad (26)$$

where $c_c$ is the viscous damping constant. Then the rotational form of Newton's Second Law of Motion gives for the motion of either mass $$I_c \ddot{\alpha} = -rk_c(r\alpha) - rc_c(r\dot{\alpha}) + rf_c(t) \quad (27)$$

where $I_c$ is the moment of inertia of one mass about the $e_2$ axis, i.e., $$I_c = mr^2 \quad (28)$$

From the geometry of FIG. 3 the component of displacement in the $e_3$ direction due to the rotation $\alpha$ is $$u_c = r \sin \alpha \quad (29)$$

which for small angles reduces to $$u_c = r\alpha \quad (30)$$

Substituting eqs. (24), (28) and (30) into eq. (27) and dividing by r produces the equation of motion for the Coriolis displacements $$m\ddot{u}_c + c_c \dot{u}_c + k_c u_c = (2\dot{m}_o \dot{u}_d) \sin \omega_d t \quad (31)$$

or in canonical form $$\ddot{u}_c + 2\omega_c \zeta_c \dot{u}_c + \omega_c^2 u_c = \frac{2\dot{m}_o \dot{u}_d}{m} \sin \omega_d t \quad (32)$$

where the natural frequency $\omega_c$ and critical damping ratio $\zeta_c$ of the Coriolis motions are given by $$\omega_c^2 = \frac{k_c}{m} \quad (33)$$

$$\zeta_c = \frac{c_c}{2\sqrt{(k_c m)}} \quad (34)$$

The solution to the equation of motion for the Coriolis displacements is $$u_c(t) = H_c \sin(\omega_d t - \phi_c) \quad (35)$$

where the amplitude function $H_c$ and phase angle function $\phi_c$ are given by $$\phi_c = \tan^{-1}\left(\frac{2\omega_c \omega_d \zeta_c}{(\omega_c^2 - \omega_d^2)}\right) \quad (36)$$

$$H_c = \left(\frac{2\dot{m}_o \dot{u}_d}{k_c}\right)\left(\frac{\omega_c^2}{\sqrt{(\omega_c^2 - \omega_d^2)^2 + (2\omega_c \omega_d \zeta_c)^2}}\right) \quad (37)$$

The total motion of the two mass system is composed of the Coriolis motions superimposed on the bending motions as shown in FIG. 3. The displacements of the right mass $u_r$ and the left mass $u_l$ are given by $$u_r = u_b + u_c \quad (38)$$

$$u_l = u_b - u_c \quad (39)$$

This completes the description of the idealized lumped parameter model of the flow tube. Given the parameters of the system $\omega_b, \zeta_b, k_b \ldots$ bending motions
$\omega_c, \zeta_c, k_c \ldots$ Coriolis motions
$\omega_d, \dot{u}_d, f_b \ldots$ driver parameters
$\dot{m}_o \ldots$ mass flow rate the complete steady state motion of the flow tube can be calculated.

Figure 4:
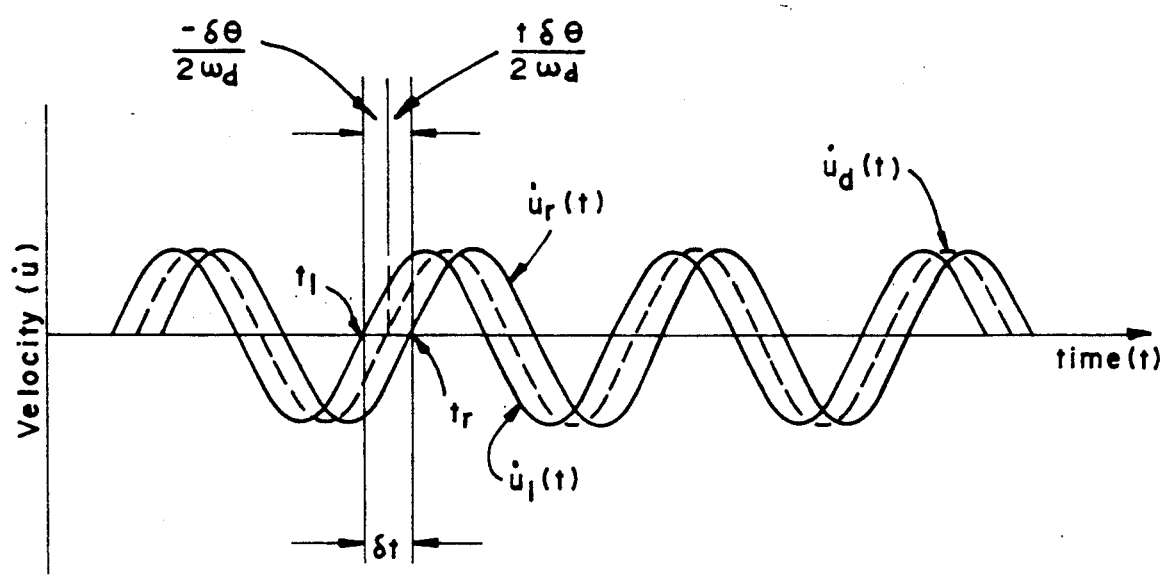
FIG. 4 is a graphical presentation of sinusoidal waveforms which illustrates zero crossings of motion sensors for two lumped masses and a driver.

FIG. 4 illustrates zero crossings of sine curves generated by velocity transducers, which can be used to derive mass flow rate as explained below. The two solid sinusoids represent the velocities of the two sides of the flow conduit. The broken sinusoid represents the velocity of the driver element.

The analysis above permits the development of various schemes for measuring the steady flow of mass through the flow tube. The fundamental concept is, that by making measurements of the motions of the flow tube, the mass flow rate can be determined. Only velocity measurements will be considered here, but similar schemes based on the use of displacement or acceleration transducers can be developed. Similarly, only schemes based on time delays or phase angle differences will be discussed. Only zero crossings will be used, but it is understood that by similar analysis arbitrary level crossings could be used.

It is assumed that the idealized flow tube in FIG. 2 is equipped with velocity transducers such that continuous time measurements are made of the velocity of the right and left masses. Using eqs. (21), (35), (38) and (39), and differentiating with respect to time, yields these velocities:

$$\dot{u}_r(t) = [H_b \cos(\omega_d t - \phi_b) + H_c \cos(\omega_d t - \phi_c)]\omega_d \quad (40)$$

$$\dot{u}_l(t) = [H_b \cos(\omega_d t - \phi_b) - H_c \cos(\omega_d t - \phi_c)]\omega_d \quad (41)$$

Further, assume that the system is driven at the resonance of the bending motions, i.e. set $$\omega_d = \omega_b \quad (42)$$

From eqs. (19), (20), (22), and (23) the amplitude function $H_b$ and phase angle $\phi_b$ reduce to $$H_b = \frac{f_b}{\omega_d c_b} \quad (43)$$

$$\phi_o = \frac{\pi}{2} \quad (44)$$

Substituting eqs. (43) and (44) into the velocity equations and using well-known mathematical identities gives $$\dot{u}_r(t) = \left[\left(\frac{f_b}{\omega_d c_b}\right)\sin \omega_d t + H_c \cos(\omega_d t - \phi_c)\right]\omega_d \quad (45)$$

$$\dot{u}_l(t) = \left[\left(\frac{f_b}{\omega_d c_b}\right)\sin \omega_d t - H_c \cos(\omega_d t - \phi_c)\right]\omega_d \quad (46)$$

FIG. 4 shows a plot of these velocities as functions of time, where it is assumed that $H_c$ is small in comparison to $H_b$, and that $\phi_c$ is a small angle. The two sine waves are offset such that $\dot{u}_l$ crosses zero before $\dot{u}_r$. The times when these zero crossings occur are $t_l$ and $t_r$, and they can be found by setting eqs. (45) and (46) to zero:

$$\left(\frac{f_b}{\omega_d c_b}\right)\sin(\omega_d t_r) + H_c \cos(\omega_d t_r - \phi_c) = 0 \qquad (47)$$

$$\left(\frac{f_b}{\omega_d c_b}\right)\sin(\omega_d t_l) - H_c \cos(\omega_d t_l - \phi_c) = 0 \qquad (48)$$

Of course, if level crossings were used, the right hand side of equations 30 and 31 would be set equal to the level value rather than zero and the analysis would proceed.

At this stage, it is assumed that all the system parameters are known, such that eq. (47) has only the one unknown quantity $t_r$. Similarly eq. (48) has only the one unknown $t_l$. If each of these equations are solved separately, $t_r$ and $t_l$ are obtained, i.e. the time when the velocity of the respective mass crosses the zero level.

There are several methods for solving eqs. (47) and (48). One approach is to make a simple change of variables as follows. The general relationship between phase angle and time is $$\theta = \omega t \qquad (49)$$

where $\theta$ is phase angle in radians, and $\omega$ is an arbitrary angular frequency. For the steady state motions of the flow tube under consideration, all motions occur at the frequency of the driver $\omega_d$. Thus, the proper change of variables for this problem is $$\theta = \omega_d t \qquad (50)$$

The phase angle $\theta$ is measured with respect to time zero, and increases as time increases. The previously defined phase angles $\phi_b$ and $\phi_c$ are of different type in that they are restricted to the interval $(-\pi, \pi)$.

From the sinusoidal driver force, the driver phase has zero crossing at $$\eta_d = n\pi \qquad (51)$$

where n is an integer in the set (0, 1, 2, ...). The even values of n correspond to zero crossings with positive slope, and the odd values of n correspond to zero crossings with negative slope. This is plotted in FIG. 4. Now define the difference in phase between the right and left velocity traces as $\delta\theta$, and consider only the zero crossings with positive slope. Then, assuming the symmetry shown in FIG. 4, the zero crossings of the two velocity traces occur at $$\theta_r = 2n\pi + \delta\theta/2 \qquad (52)$$

$$\theta_l = 2n\pi - \delta\theta/2 \qquad (53)$$

Using eqs. (50), (52) and (53) and well-known mathematical identities, the time equations (47) and (48) are transformed to the following phase angle difference equations:

$$\left(\frac{f_b}{\omega_d c_b}\right)\sin(\delta\theta/2) + H_c \cos(\delta\theta/2 - \phi_c) = 0 \qquad (54)$$

-continued $$\left(\frac{f_b}{\omega_d c_b}\right)\sin(\delta\theta/2) + H_c \cos(\delta\theta/2 + \phi_c) = 0 \qquad (55)$$

A general solution to the phase angle difference equations (54) and (55) can be obtained. Restated they are $$\left(\frac{f_b}{\omega_d c_b}\right)\sin(\delta\theta/2) = -H_c \cos(\delta\theta/2 - \phi_c) \qquad (56)$$

$$\left(\frac{f_b}{\omega_d c_b}\right)\sin(\delta\theta/2) = -H_c \cos(\delta\theta/2 + \phi_c) \qquad (57)$$

There are two equations in the one unknown quantity $H_c$. Adding the squares of eqs. (56) and (57) yields $$2\left(\frac{f_b}{\omega_d c_b}\right)^2 \sin^2(\delta\theta/2) = \qquad (58)$$

$$H_c^2 [\cos^2(\delta\theta/2 - \phi_c) + \cos^2(\delta\theta/2 + \phi_c)]$$

Employing well-known mathematical identities and taking the negative square root yields $$H_c = -\left(\frac{\sqrt{2}f_b}{c_b}\right)\frac{\sin(\delta\theta/2)}{\omega_d\sqrt{1 + \cos(2\phi_c)\cos(\delta\theta)}} \qquad (59)$$

Setting eq. (59) equal to eq. (37) and solving for the mass flow rate yields $$\dot{m}_o = -\left(\frac{\sqrt{2}f_b}{2c_b\dot{u}_d}\right)k_c \frac{\sqrt{(\omega_c^2 - \omega_d^2)^2 + (2\omega_c\omega_d\zeta_c)^2}}{\omega_c^2} \times \qquad (60)$$

$$\frac{\sin(\delta\theta/2)}{\omega_d\sqrt{1 + \cos(2\phi_c)\cos(\delta\theta)}}$$

Equation (60) is the general solution to the phase angle difference equations.

Figure 5:
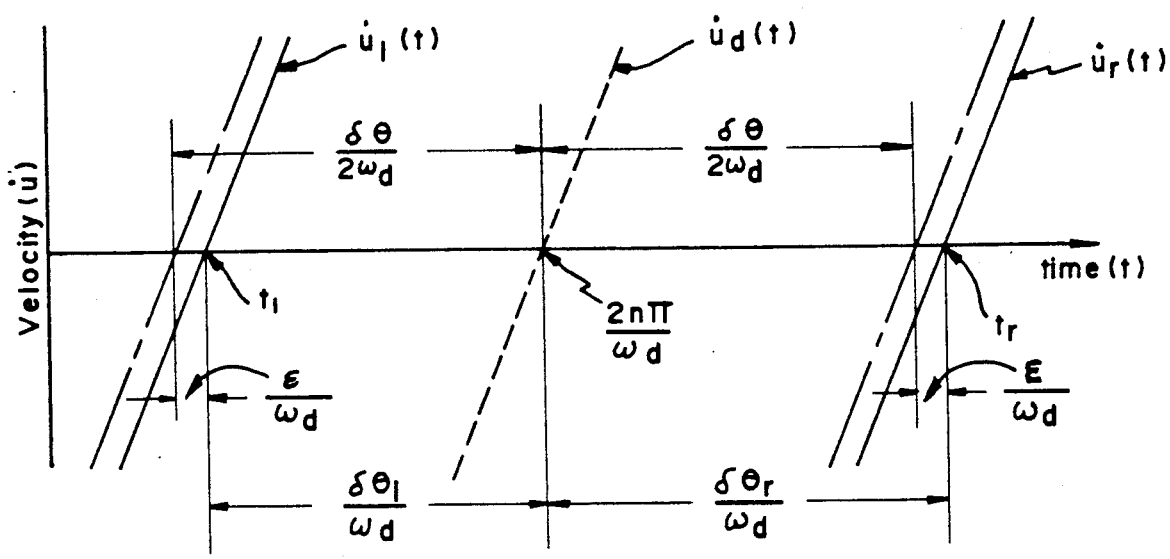
FIG. 5 is a graphical presentation of a representative asymmetric zero crossing for motion sensors for two lumped masses and a driver.

The formula in eq. (60) is the general solution for the prior art formulas discussed previously, all of which are based on an assumption of no asymmetric behavior. FIG. 5 is a detailed view of the zero crossings. Instead of the zero crossing times $t_r$ and $t_l$ being symmetric with respect to the driver, both times lag the symmetric position by the same small amount. For the asymmetric case, eqs. (52) and (53) are replaced by $$\theta_r = 2n\pi + \delta\theta_r \qquad (61)$$

$$\theta_l = 2n\pi - \delta\theta_l \qquad (62)$$

Proceeding as before, eqs. (61) and (62) are substituted into the zero crossing equations (47) and (48), and eq. (50) is used to make the change of variables. These equations are then solved separately for the phase angle difference $\delta\theta_r$ and $\delta\theta_l$.

$$\tan \delta\theta_r = \frac{-H_c \cos \phi_c}{\left[\frac{f_b}{\omega_d c_b} + H_c \sin \phi_c\right]} \quad (63)$$

$$\tan \delta\theta_l = \frac{-H_c \cos \phi_c}{\left[\frac{f_b}{\omega_d c_b} - H_c \sin \phi_c\right]} \quad (64)$$

Consider the special case when the Coriolis motions are undamped. The phase angle $\phi_c$ is zero, and eqs. (63) and (64) reduce to the identical expression $$\tan \delta\theta_r = \tan \delta\theta_l = \frac{-H_c}{\left[\frac{f_b}{\omega_d c_b}\right]} \quad (65)$$

But from FIG. 5 this is just the symmetric case previously discussed, i.e.

$$\delta\theta_r = \delta\theta_l = \frac{\delta\theta^o}{2} \quad (66)$$

For non-zero damping, define $$\delta\theta_r = \frac{\delta\theta^o}{2} + \epsilon \quad (67)$$

$$\delta\theta_l = \frac{\delta\theta^o}{2} - \epsilon \quad (68)$$

where $\epsilon$ is the non-zero lag shown in FIG. 5. Then substituting eq. (65) into eqs. (63) and (64), and employing well-known mathematical identities yields the following expressions for the zero crossing asymmetry:

$$\tan \delta\theta_r = \frac{\tan(\delta\theta^o/2)\cos \phi_c}{[1 - \tan(\delta\theta^o/2)\sin \phi_c]} \quad (69)$$

$$\tan \delta\theta_l = \frac{\tan(\delta\theta^o/2)\cos \phi_c}{[1 + \tan(\delta\theta^o/2)\sin \phi_c]} \quad (70)$$

As is readily apparent, eq. 69 can be solved for $$\tan \frac{\delta\theta^o}{2}$$

to yield $$\tan \frac{\delta\theta^o}{2} = \frac{\tan \delta\theta_r}{\cos \phi_c + \tan \delta\theta_r \sin \phi_c} \quad (69a)$$

Similarly, eq. 70 can be solved for tan to yield $$\tan \frac{\delta\theta^o}{2} = \frac{\tan \delta\theta_l}{\cos \phi_c - \tan \delta\theta_l \sin \phi_c} \quad (70a)$$

If the total phase angle difference $\delta\theta^o$ is measured, then the right side of eq. (69) is known, and it can be set equal to the right hand side of eq. (63). This results in a simple expression for the amplitude function $H_c$, which again can be used in eq. (37). Solving for the mass flow rate yields $$\dot{m}_o = -\left(\frac{f_b}{2c_b \dot{u}_d}\right) k_c \frac{\sqrt{(\omega_c^2 - \omega_d^2)^2 + (2\omega_c \omega_d \zeta_c)^2}}{\omega_c^2} \times \frac{\tan(\delta\theta^o/2)}{\omega_d} \quad (71)$$

This is the correct solution to the zero crossing equations. The same manipulations on eqs. (64) and (70) yield identical results. It should be noted that had level crossing equations been employed, the same result would be obtained as for zero crossing equations.

For the case of non-metallic conduits or for the case of damping due to fluid flow, such as that due to air entrained in liquid, it can be demonstrated by one skilled in the art that equations (69-71) are modified by a cos $\phi_c$ term as follows:

$$\tan \delta\theta_r = \frac{\tan(\delta\theta^o/2) \cos^2 \phi_c}{[1 - \tan(\delta\theta^o/2) \sin\phi_c \cos \phi_c]} \quad (72)$$

$$\tan \delta\theta_l = \frac{\tan(\delta\theta^o/2) \cos^2 \phi_c}{[1 + \tan(\delta\theta^o/2) \sin \phi_c \cos \phi_c]} \quad (73)$$

$$\dot{m}_o = -\left(\frac{f_b}{2c_b \dot{u}_d}\right) k_c \frac{\sqrt{(\omega_c^2 - \omega_d^2)^2 + (2\omega_c \omega_d \zeta_c)^2}}{\omega_c^2} \times \frac{\tan(\delta\theta^o/2)}{\omega_d} \cos \phi_c \quad (74)$$

For all cases wherein damping is unimportant, cos $\phi_c$ is essentially unity and hence does not need to be accounted for. For materials, such as, but not limited to, non-metallic tubes, wherein damping is important, or when there is two phase flow which results in damping, account should be taken of cos $\phi_c$. The derivation of Equations 72-74 is as follows. For zero damping, $\zeta_c$ and $\phi_c$ are zero. Thus, the amplitude function (eq. 37) becomes $$H_c^o = \left(\frac{2\dot{m}_o \dot{u}_d}{k_c}\right) \frac{\omega_c^2}{(\omega_c^2 - \omega_d^2)} \quad (75)$$

where the zero superscript indicates zero damping. From equations (63) and (64)

$$\tan \delta\theta_r = \tan \delta\theta_l = \frac{-H_c^o}{\left(\frac{f_b}{\omega_d c_b}\right)} \quad (76)$$

i.e., there is no asymmetry and $$\delta\theta_r = \delta\theta_l = \frac{1}{2}\delta\theta^o \quad (77)$$

Thus eq. (76) can be re-written $$\left(\frac{f_b}{\omega_d c_b}\right) = \frac{-H_c^o}{\tan \frac{\delta\theta^o}{2}} \quad (78)$$

For a lightly damped system with $\omega_d$ not near $\omega_c$, the frequency response amplitude function has little dependence on $\zeta_c$. Thus, the following approximation is made.

$$H_c = H_c^o \quad (79)$$

and eq. (78) becomes $$\left(\frac{f_b}{\omega_d c_b}\right) = \frac{-H_c}{\tan\frac{\delta\theta^o}{2}} \quad (80)$$

Substituting eq. (80) into eq. (63) with some manipulations produces eq. (69):

$$\tan\delta\theta_r = \frac{\tan\frac{\delta\theta^o}{2}\cos\phi_c}{\left[1 - \tan\frac{\delta\theta^o}{2}\sin\phi_c\right]} \quad (69)$$

The same approximation is used to derive eq. (70). Now suppose the flow meter is not lightly damped such that eq. (79) is not valid. Equation (37) can be re-written $$\frac{1}{H_c^2} = \left[\frac{1}{(H_c^o)^2} + \left(\frac{k_c}{2 m_o u_d}\right)^2 \left(\frac{2\omega_c \omega_d J_c}{\omega_c^2}\right)^2\right] \quad (81)$$

where use has been made of eq. (78). Multiplying eq. (81) by $(H_c^o)^2$ and simplifying yields $$\left(\frac{H_c^o}{H_c}\right)^2 = 1 + \left[\frac{2\omega_c \omega_d J_c}{(\omega_c^2 - \omega_d^2)^2}\right]^2 \quad (82)$$

But making use of eq. (36), eq. (82) becomes $$\left(\frac{H_c^o}{H_c}\right)^2 = 1 + \tan^2\phi_c \quad (83)$$

or $$\frac{H_c^o}{H_c} = \frac{1}{\cos\phi_c} \quad (84)$$

Substituting eq. (84) into equation (78) yields $$\frac{f_b}{\omega_d c_b} = \frac{-H_c}{\tan\frac{\delta\theta^o}{2}\cos\phi_c} \quad (85)$$

Finally, substituting eq. (85) into eq. (63) and simplifying yields $$\tan\delta\theta_r = \frac{\tan\frac{\delta\theta^o}{2}\cos^2\phi_c}{\left[1 - \tan\frac{\delta\theta^o}{2}\cos\phi_c\sin\phi_c\right]} \quad (72)$$

which is eq. (72). Equation (73) is similarly derived by substituting eq. (85) into eq. (64).

To derive eq. (74), set eq. (63) equal to eq. (72) and solve for the frequency response amplitude function. The result is $$H_c = \left(\frac{-f_b}{\omega_d c_b}\right) \tan\frac{\delta\theta^o}{2}\cos\phi_c \quad (86)$$

Now set eq. (86) equal to eq. (37) and solve for the mass flow rate $\dot{m}_o$. This yields eq. (74).

Some additional mass flow measurement schemes can be developed from this analysis. The phase angle difference equation (54) can be solved for $H_c$:

$$H_c = \left(\frac{-f_b}{\omega_d c_b}\right)\frac{\sin\delta\theta_r}{\cos(\delta\theta_r - \phi_c)} \quad (87)$$

Then setting eq. (87) equal to eq. (37) and solving for the mass flow rate yields $$m_o = \left(\frac{-f_b}{z c_b u_d}\right)k_c\left(\frac{[(\omega_c^2 - \omega_d^2)^2 + (2\omega_c \omega_d \zeta_c)^2]^{\frac{1}{2}}}{\omega_c^2}\right)\frac{1}{\omega_d}\frac{\sin\delta\theta_r}{\cos(\delta\theta_r - \phi_c)} \quad (88)$$

The same equation can be derived from eq. (55), but the sign of $\delta\theta_l$ must be taken into account. Equation (88) can be used to determine mass flow rate by direct measurement of either $\delta\theta_r$ or $\delta\theta_l$.

As asymmetric correction scheme can be derived from the previous analysis. Equations (72) can be solved for $$\tan\frac{\delta\theta^o}{2},$$

i.e., $$\tan\frac{\delta\theta^o}{2} = \frac{\tan\delta\theta_r}{[\cos^2\phi_c + \tan\delta\theta_r\cos\phi_c\sin\phi_c]} \quad (89)$$

Similarly from eq. (73)

$$\tan\frac{\delta\theta^o}{2} = \frac{\tan\delta\theta_l}{[\cos^2\phi_c - \tan\delta\theta_l\sin\phi_c\cos\phi_c]} \quad (90)$$

Either eq. (89) or eq. (90) can be used to correct for asymmetry, when the flow meter is not lightly damped. To determine the mass flow rate, the value of $\delta\theta^*$ given by these equation is used in eq. (74).

Use of dual sensors requires some additional analysis. The trigonometric identity $$\tan(x + y) = \frac{\tan x + \tan y}{[1 - \tan x \tan y]} \quad (91)$$

can be used to combine eqs. (72) and (73). After simplification the result is $$\tan(\delta\theta_r + \delta\theta_l) = \frac{2\tan\frac{\delta\theta^o}{2}\cos^2\phi_c}{\left[1 - \tan^2\frac{\delta\theta^o}{2}\cos^2\phi_c\right]} \quad (92)$$

Equation (92) can be solved for $$\frac{\delta\theta^o}{2}.$$

Let $$z = \tan\left(\frac{\delta\theta^o}{2}\right) \quad (93)$$

Equation (93) can be substituted into eq. (92) and expanded to yield $$\tan(\delta\theta_r + \delta\theta_l)Z^2 + 2Z - \tan(\delta\theta_r + \delta\theta_l)\sec^2\phi_c = 0 \quad (94)$$

Using the quadratic formula and taking the positive root gives $$\tan\left(\frac{\delta\theta^o}{2}\right) = \frac{[1 + \tan^2(\delta\theta_r + \delta\theta_l)\sec^2\phi_c]^{\frac{1}{2}} - 1}{\tan(\delta\theta_r + \delta\theta_l)} \quad (95)$$

This is the dual sensor asymmetric compensation scheme for non-lightly damped flow meters. The value of $$\frac{\delta\theta^o}{2}$$

resulting from eq. (95) is used in eq. (74).

C. Embodiments of Invention

Several embodiments of mass flow meters which measure and process motion sensor signals are disclosed which provide more accurate determination of mass flow rates in Coriolis mass flow meters than have heretofore been achieved. It is envisioned that the signal processing elements of each of the embodiments may be incorporated into a microchip or other integrated circuit device. Alternatively, the signal processing portions of each embodiment may be incorporated into discrete elements which are connected to form a signal processing system.

Three embodiments disclosed herein relate to detecting motion sensor signals and processing such signals according to equation 71:

$$\dot{m}_o = -\left(\frac{f_b}{2\,c_b\,\dot{u}_d}\right)k_c\frac{\sqrt{(\omega_c^2 - \omega_d^2)^2 + (2\omega_c\,\omega_d\,\zeta_c)^2}}{\omega_c^2} \times \frac{\tan(\delta\theta^o/2)}{\omega_d} \quad (71)$$

The terms of the equation can be grouped as follows:

| | |
|---|---|
| $\dot{m}_o$ | is mass flow rate |
| $K_1 = -\left(\frac{f_b}{2c_b\,\dot{u}_d}\right)$ | where $K_1$ represents a group of calibration constants |
| $f_b$ | is the force due to the driver acting on half of the flow tube. |
| $c_b$ | is the combined damping constant for the flow tube for bending motions |
| $\dot{u}_d$ | is the driver velocity |
| $c_b\,\dot{u}_d$ | can be recast as a viscous damping force $f_o$ resisting oscillations of the flow tube |

*-continued*

| | |
|---|---|
| Therefore | |
| $K_1 = -\left(\frac{f_b}{2f_o}\right)$ | where the respective forces can be measured by techniques known to one skilled in the art, |
| $k_c$ | is the elastic spring constant of the flow tube which interacts against Coriolis forces. For known constant temperature operation, this is a constant and would be a second calibration constant $K_2$. For unknown or varying temperature operation, this parameter must be temperature-compensated. |
| $\omega_d$ | is the frequency at which the flow tube is driven to oscillate. |
| $\dfrac{\sqrt{(\omega_c^2 - \omega_d^2)^2 + (2\omega_c\,\omega_d\,\zeta_c)^2}}{\omega_c^2}$ | Is a frequency response function, where |
| $\omega_d$ | is the drive frequency, above; |
| $\omega_c$ | is the natural frequency of the flow tube about the axis where the Coriolis force acts; |
| $\zeta_c = \left(\dfrac{c_c}{2\sqrt{k_c m}}\right)$ | is the damping ratio of the flow tube about the axis where the Coriolis force acts and can be determined from techniques known to those skilled in the art; |
| $c_c$ | is the combined damping constant for motion of the flow tube about the axis where the Coriolis force acts, and can be determined by dividing the viscous damping force acting about the Coriolis axis by the velocity of the flow tube about the same axis, |
| $k_c$ | is the spring constant above, |
| m | is the mass of the flow tube, flow tube appendages, and the fluid filling the tube whose flow is to be measured. |
| $\tan(\delta\theta^*/2)$ | is a half-angle tangent function, where |
| $\delta\theta^*$ | is the phase angle difference between the velocities measured by two motion sensors located essentially equidistant from the midpoint of the flow tube. |

The result of this equation is that mass flow rate can be determined by determining the phase angle difference of motion signals from two locations on a flow tube, measuring the drive frequency of the flow tube, and compensating for temperature, as needed. The advantages of this equation, which is employed in the following embodiments, are that it allows for greater phase angles and increased accuracy at full flow rates. Greater phase angles will improve the signal-to-noise ratio in noisy environments, such as gas flow environments.

An embodiment which accounts for asymmetry and viscous damping employs equation (88):

$$\dot{m}_o = -\left(\frac{f_b}{2 c_b \dot{u}_d}\right) k_c \frac{\sqrt{(\omega_c^2 - \omega_d^2)^2 + (2\omega_c \omega_d \zeta_c)^2}}{\omega_c^2} \times \quad (88)$$

$$\frac{1}{\omega_d} \frac{\sin \delta\theta_l}{\cos(\delta\theta_l - \phi_c)}$$

The sign for this equation is as shown if $\delta\theta_l > 0$. If $\delta\theta_l < 0$, then the sign is changed. The symbols used in the above equation are the same as discussed for equation 71 with the exception that

| | |
|---|---|
| $\frac{\sin \delta\theta_l}{\cos(\delta\theta_l - \phi_c)}$ | is the trigonometric function which replaces the half-angle tangent function of equation (71) |
| and $\phi_c$ | is the Coriolis phase angle function. |

Figure 11:
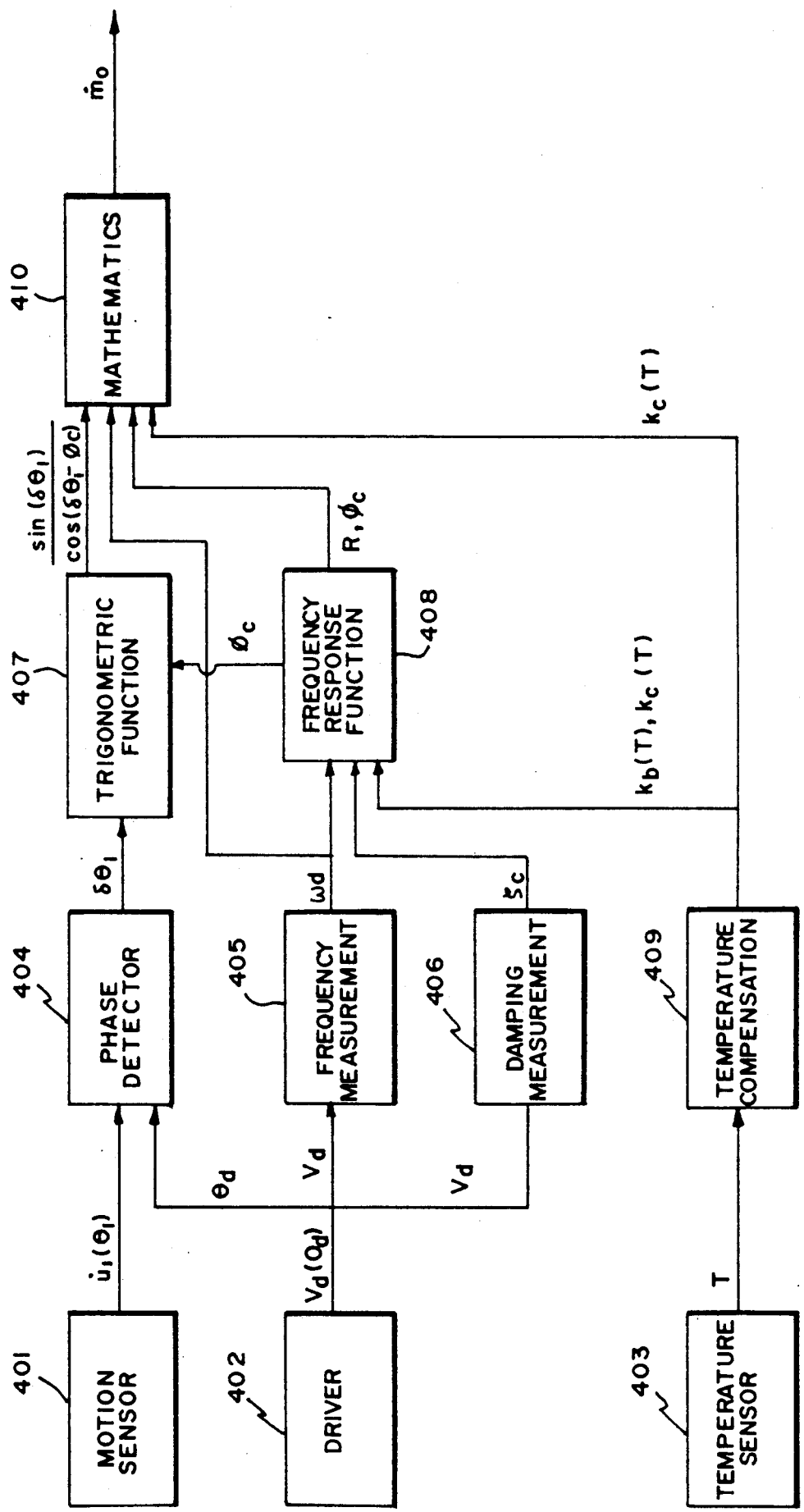
FIG. 11 is a block diagram of signal processing logic for an embodiment of the invention for a signal processing approach incorporated in a mass flow meter to measure mass flow rate using one flow conduit motion sensor which accounts for asymmetries and viscous damping.

The embodiment employing this equation is shown in FIG. 11.

Figure 12:
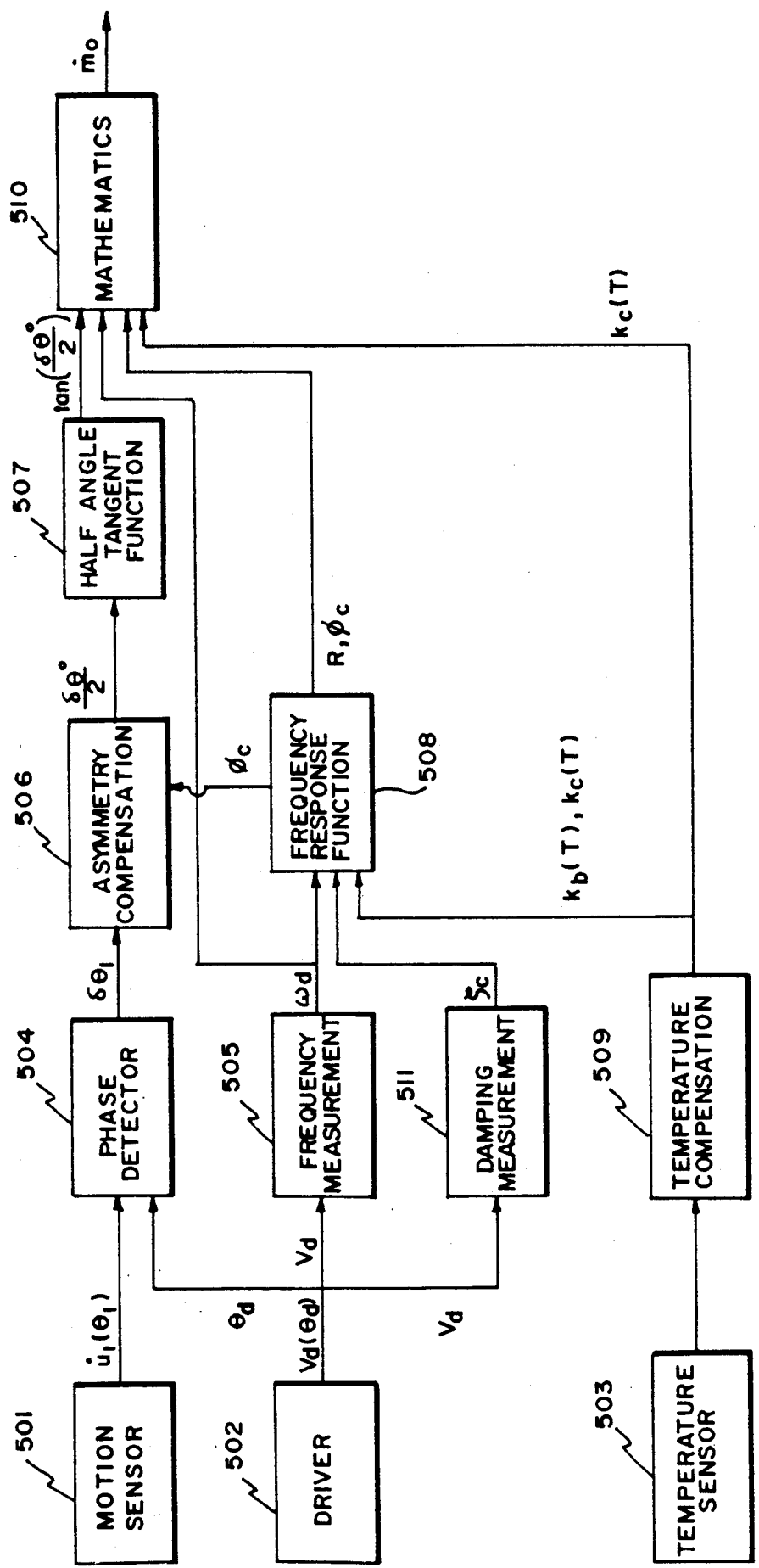
FIG. 12 is a block diagram of signal processing logic for an embodiment of the invention for a signal processing approach incorporated in a mass flow meter to measure mass flow rate using one flow conduit motion sensor which accounts for asymmetries and viscous damping.

Another embodiment which accounts for both asymmetry and viscous damping employs equation (74):

$$\dot{m}_o = -\left(\frac{f_b}{2 c_b \dot{u}_d}\right) k_c \frac{\sqrt{(\omega_c^2 - \omega_d^2)^2 + (2\omega_c \omega_d \zeta_c)^2}}{\omega_c^2} \times \quad (74)$$

$$\frac{\tan(\delta\theta^*/2)}{\omega_d} \cos \phi_c$$

where the symbols are as before in equation 71, but where $\phi_c$ is the Coriolis phase angle function and $\tan(\delta\theta^*/2)$ is the half-angle tangent function for undamped oscillations given by equation (89):

$$\tan \frac{\delta\theta^o}{2} = \frac{\tan \delta\theta_r}{[\cos^2 \phi_c \pm \tan \delta\theta_r \cos \phi_c \sin \phi_c]} \quad (89)$$

with the positive sign in the denominator being used for phase lag and negative for phase lead. The embodiment employing this approach is shown in FIG. 12.

Figure 13:
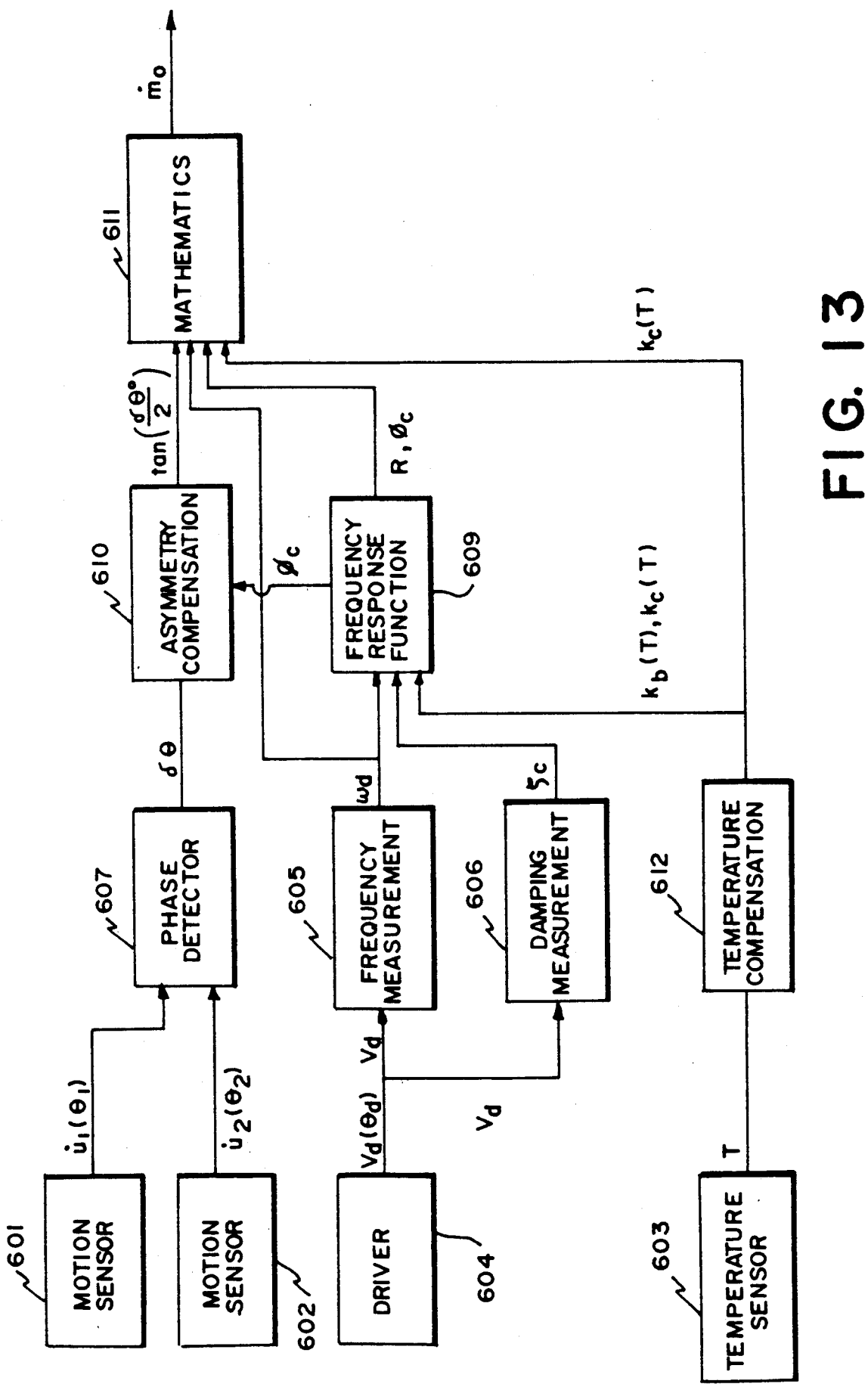
FIG. 13 is a block diagram of signal processing logic for an embodiment of the invention for a signal processing approach incorporated in a mass flow meter to measure mass flow rate using two flow conduit motion sensors which account for asymmetries and viscous damping.

A final embodiment, shown in FIG. 13, also employs the signal combination approach of equation (74). This embodiment accounts for asymmetry and viscous damping and employs the signals from two motion sensors. The half-angle tangent function that is employed uses equation (95):

$$\tan\left(\frac{\delta\theta^o}{2}\right) = \frac{[1 + \tan^2(\delta\theta_r + \delta\theta_l) \sec^2 \phi_c]^{\frac{1}{2}} - 1}{\tan(\delta\theta_r + \delta\theta_l)} \quad (95)$$

The symbols are the same as described above.

The mass flow rate equation (71) permits a compensation scheme for the changes in the resonant frequency of oscillation and the Coriolis natural frequency which result from changes in density of the fluid flowing through the conduit. In the embodiments which follow, temperature-compensated spring constants about the oscillation axis and the transverse Coriolis axis are obtained by measuring the flow conduit temperature. As one skilled in the art will recognize, the density of the fluid in the conduit can be determined according to the formula:

$$\rho = \frac{k_b(T) P^2}{K_A} - K_B \quad (96)$$

where $\rho$ is density $P = \frac{2\pi}{\omega_d}$ is the period of oscillation $k_b(T)$ is the temperature — compensated spring constant about the oscillation axis $K_A$ and $K_B$ are constants A derivation and discussion of this formula can be found in U.S. Pat. No. 4,491,009. Specific density meter circuitry embodiments employing this technique are found in U.S. patent application Ser. Nos. 916,973 and 916,780, both filed Oct. 9, 1986.

Since the total mass of the fluid-filled conduit is given by /

$$m = m_T + m_F \quad (97)$$

where
 m = total mass
 $m_T$ = tube mass and appendages
 $m_F$ = fluid mass
and $$m_F = \rho V_o \quad (98)$$

where $V_o$ is the tube volume, then $$m = m_T + \rho V_o \quad (99)$$

Therefore, the Coriolis natural frequency is given by $$\omega_c = \sqrt{\frac{k_c(T)}{m}} = \sqrt{\frac{k_c(T)}{m_T + \rho V_o}} \quad (100)$$

The Coriolis natural frequency can then be determined by employing the temperature-compensated spring constant about the Coriolis axis transverse to the oscillation axis, the known tube mass and volume and the measured density.

Equation (37) demonstrates how the amplitude of the Coriolis motions $H_c$, depends on the frequency response function. The frequency response function contains terms which account for the density of the process fluid. If the density changes, both the resonant frequency of oscillation and the Coriolis natural frequency change. The feedback system of the meter works to keep the system at resonance, i.e. the drive frequency moves to the new bending frequency. However, unless the ratio of the new frequencies is unchanged, the amplitude of the Coriolis motions will change without any change in the mass flow rate. This causes an error in the measured mass flow rate. The embodiments herein contain a compensation scheme for this problem. The drive frequency is continuously measured. From the drive frequency it is possible to determine the density of the fluid in the conduit. Equation (100) above is used to correct the Coriolis frequency. Then according to eq. (71) with these frequencies plus the damping ratio of the Coriolis motions, the frequency response effect is cancelled. This correction is carried out in frequency response function logic elements in the embodiments disclosed herein.

Figure 6:
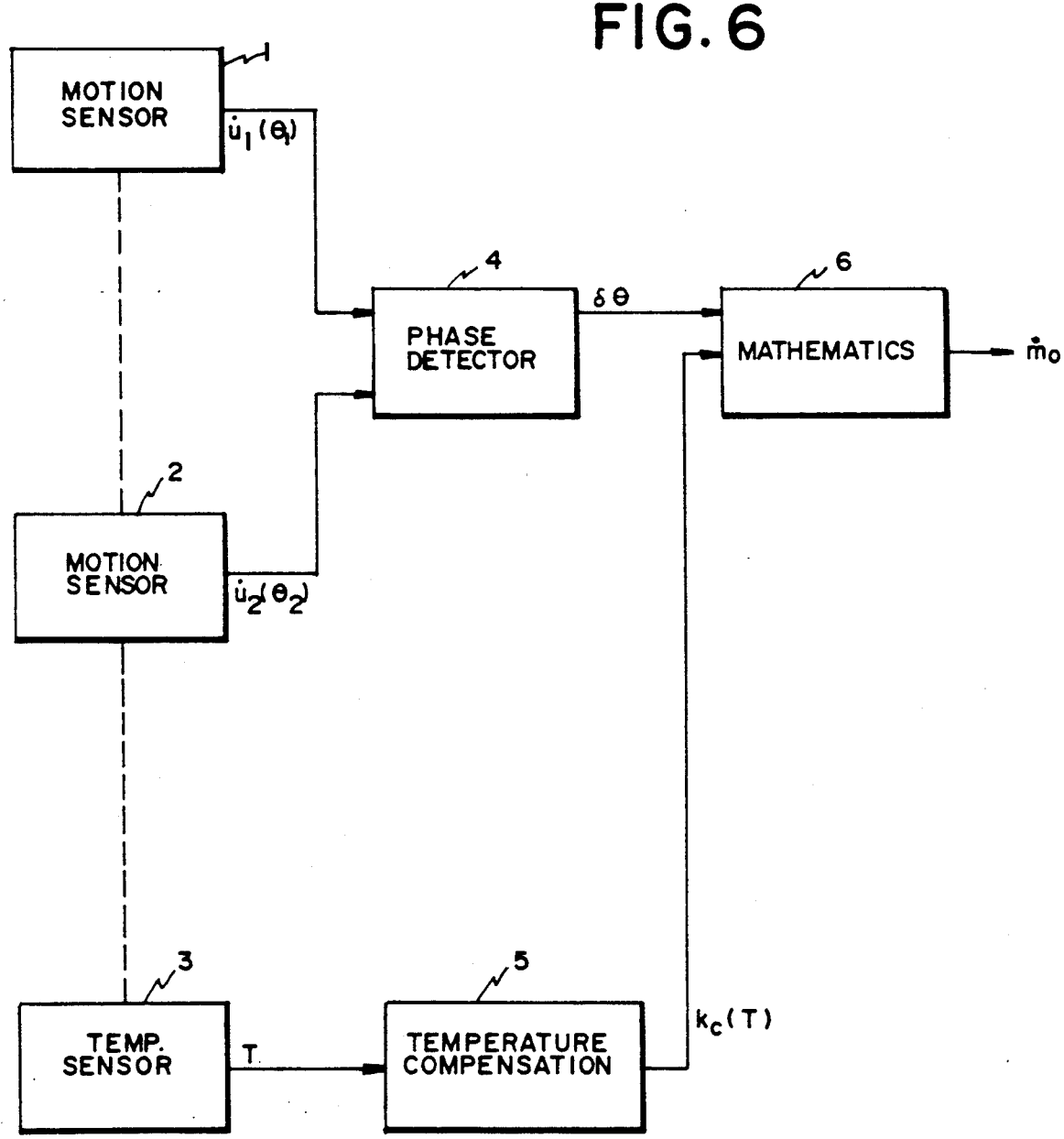
FIG. 6 is a block diagram of signal processing logic for an existing linearized signal processing approach incorporated in a mass flow meter to measure mass flow rate.

An existing linearized embodiment of the signal processing logic for a mass flow meter is depicted in a block diagram in FIG. 6. In this embodiment, the signals of two motion sensors are employed to determine a phase angle difference which is processed further with calibration constants to produce a mass flow measurement. Motion sensors 1 and 2 are mounted to monitor motion of the flow conduit at locations which are essentially equidistant from the midpoint of the flow conduit, which is assumed symmetrical in shape. In this embodiment, the motion sensors are assumed to be velocity sensors which provide signals $\dot{u}_1$ and $\dot{u}_2$, which have associated phase angles $\theta_1$ and $\theta_2$, respectively, but could also be displacement or acceleration sensors. The signals from motion sensors 1 and 2 are each input to phase detector element 4. Phase detector element 4 performs a comparison of the signals from motion sensors 1 and 2 and processes the two signals to produce a phase angle difference measurement between the two signals. Temperature sensor 3 measures the temperature of the flow conduit. Its signal is processed by temperature-compensation logic element 5. The processed temperature signal provides a temperature-compensated elastic spring constant $k_c(T)$ for the degree of freedom corresponding to the Coriolis force. The phase difference measurement and temperature-compensated spring constant are then further processed by mathematics logic element 6, where they are combined with calibration constants according to the formula $$\dot{m}_o = K_1 k_c \frac{\delta \theta}{2 \omega_d} \tag{101}$$

As one skilled in the art will recognize, this linear approach is limited by the inherent nonlinear relationship between mass flow rate and phase angle.

In the first, second, and third embodiments disclosed below, damping is either zero (undamped), or damping is very slight. In such a case, the damping ratio, $\zeta_c$, is assumed a constant, based on characteristics of the flow conduits. The damping ratio is measured beforehand for the flow meters and a constant is employed based on that predetermined value.

Figure 7:
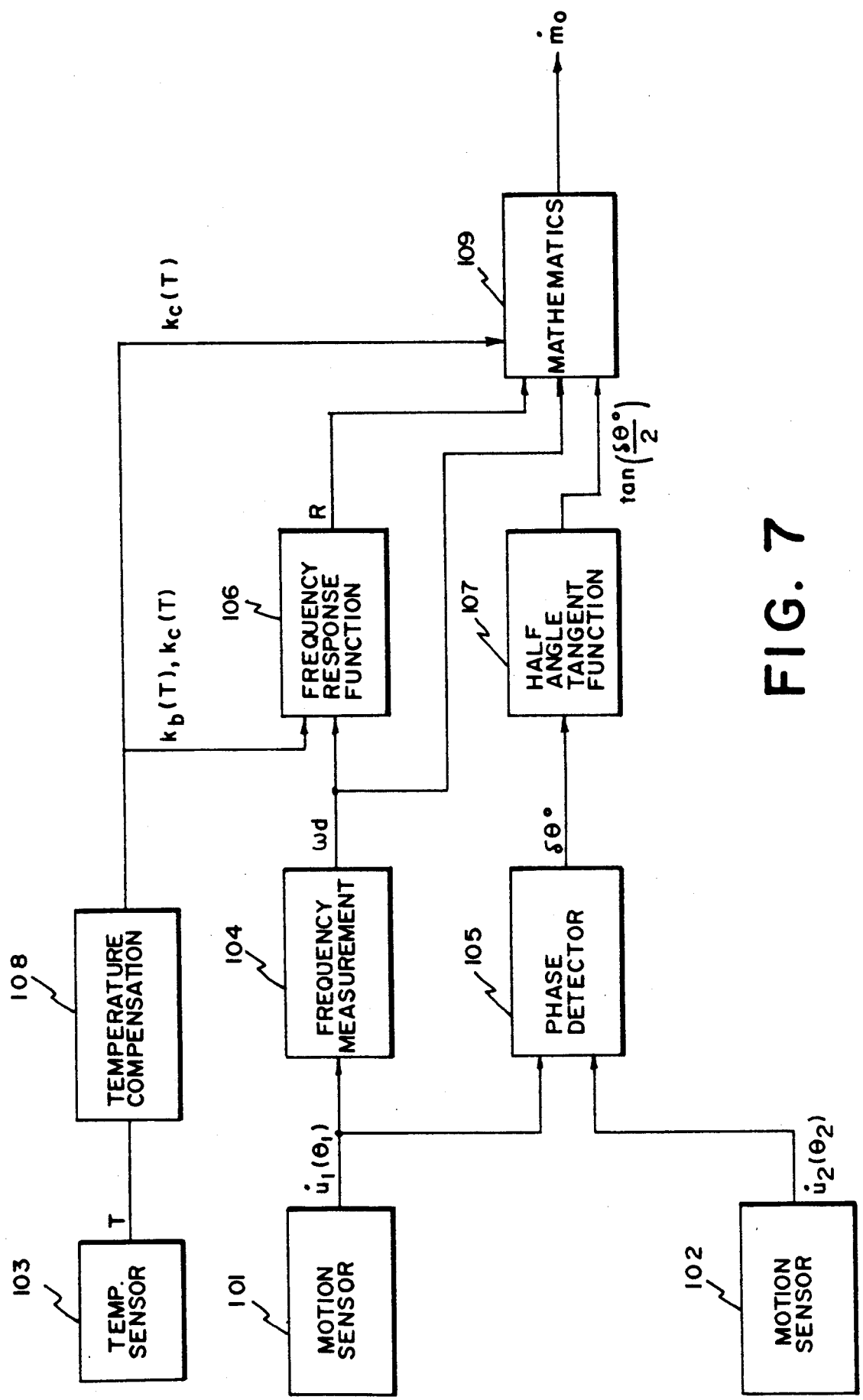
FIG. 7 is a block diagram of signal processing logic for an embodiment of the invention for a symmetric nonlinear signal processing approach incorporated in a mass flow meter to measure mass flow rate.

FIG. 7 depicts a first preferred embodiment of the signal processing logic for a mass flow meter which includes two motion sensors 101 and 102 positioned essentially equidistant from the center of the flow conduit to monitor the motion of two sides of the oscillating flow conduit. One of the motion sensor signals, here shown as a velocity signal from sensor 101, is input to frequency measurement element 104 to determine the frequency at which the oscillating flow conduit is driven. This drive frequency is input to frequency response function element 106. The drive frequency is also input to mathematics logic element 109 for further processing. Temperature sensor 103 is employed to provide a temperature of the oscillating flow conduit. This temperature measurement is input to temperature-compensation logic element 108, which processes the signal to produce two temperature-compensated spring constant signals. One spring constant signal $k_b(T)$, is for the oscillation degree of freedom. The other, $k_c(T)$, is for the Coriolis degree of freedom. Both temperature-compensated spring constant signals are input to frequency response function logic element 106, which combines these signals with the drive frequency to determine a frequency response function which accounts for any change in fluid density. The Coriolis spring constant is also input to mathematics logic element 109. The signals from each of the motion sensors $\dot{u}_1$ and $\dot{u}_2$, which have associated respective phase angles $\theta_1$ and $\theta_2$, are input to phase detector element 105 which determines the phase angle difference between the two signals. The phase angle difference is then processed by half-angle tangent function logic element 107. The result of this processing is input to mathematics logic element 109 for further processing. The measured drive frequency, processed frequency response function, processed half-angle tangent function and temperature-compensated Coriolis spring constant are combined with calibration constants in mathematics logic element 109 according to the formula of equation (71) to produce the mass flow rate as an output. As one skilled in the art will recognize, this embodiment takes into account inherent nonlinear effects in measuring mass flow rates, which are not accounted for in the existing linear embodiments. Such inherent nonlinear effects are reflected in the relationship between mass flow rate and phase angle in equation (71) and are embodied in the system of FIG. 7.

Figure 8:
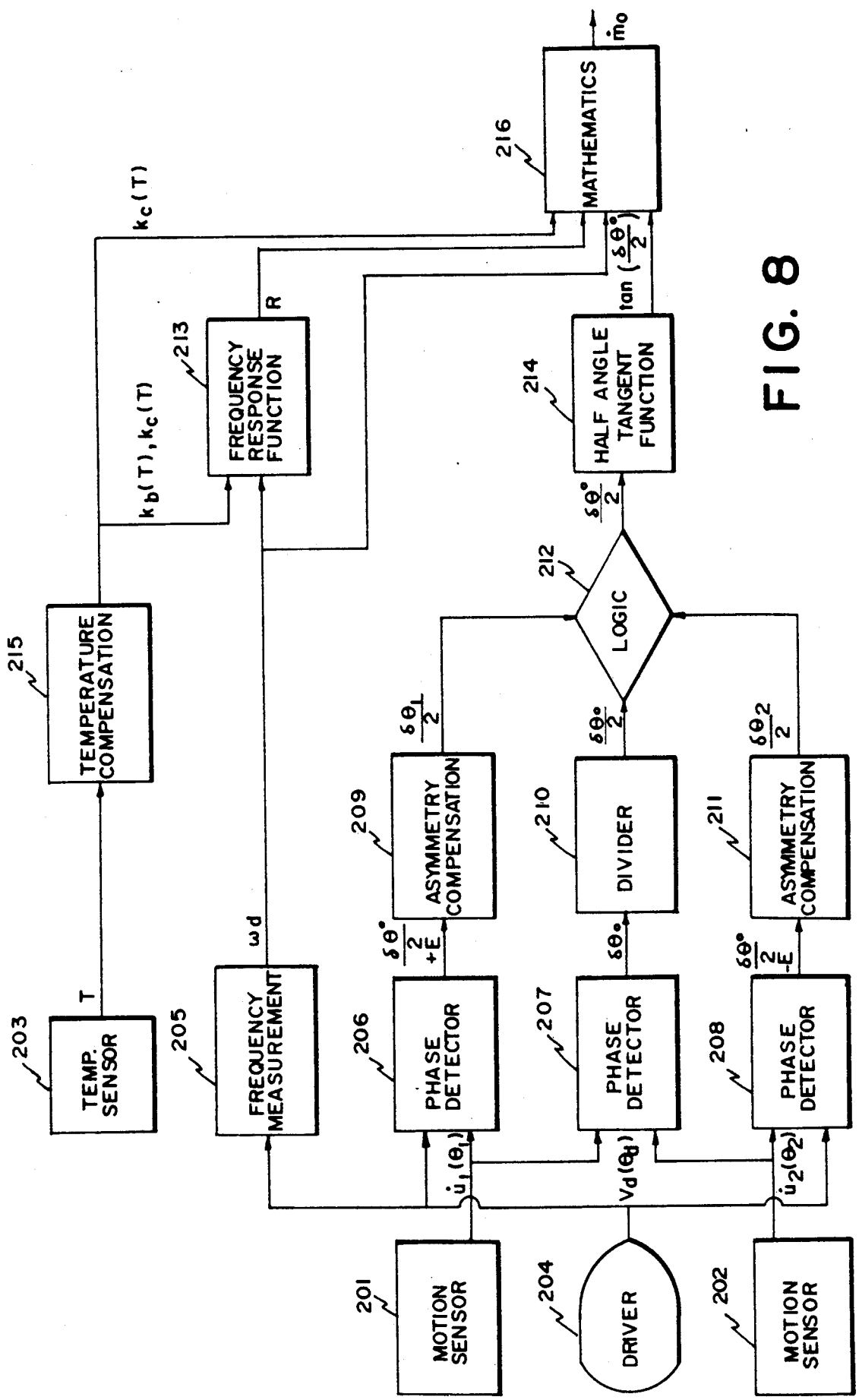
FIG. 8 is a block diagram of signal processing logic for an embodiment of the invention for an asymmetric nonlinear signal processing approach incorporated in a mass flow meter to measure mass flow rate.

A second preferred embodiment of the signal processing logic for a mass flow meter, illustrated in FIG. 8, also processes velocity signals $\dot{u}_1$ and $\dot{u}_2$ having respective associated phase angles $\theta_1$ and $\theta_2$, from two motion sensors 201 and 202, again positioned essentially equidistant from the midpoint of the flow conduits. The voltage signal $V_d$, having associated phase angle $\theta_d$, controlling driver 204 is sensed and is input to frequency measurement logic element 205. The frequency measurement logic element 205 processes the driver signal and provides as output the driver frequency. This output signal is input both to mathematics logic element 216 and to a frequency response function logic element 213. Temperature sensor 203 is employed to provide a temperature of the oscillating flow conduit. This temperature measurement is input to temperature-compensation logic element 215, which processes the signal to produce two temperature-compensated spring constant signals. One spring constant signal $k_b(T)$, is for the oscillation degree of freedom. The other, $k_c(T)$, is for the Coriolis degree of freedom. Both temperature-compensated spring constant signals are input to frequency response function logic element 213, which combines these signals with the drive frequency to determine a frequency response function which accounts for any change in fluid density. The Coriolis spring constant is also input to mathematics logic element 216.

Figure 9:
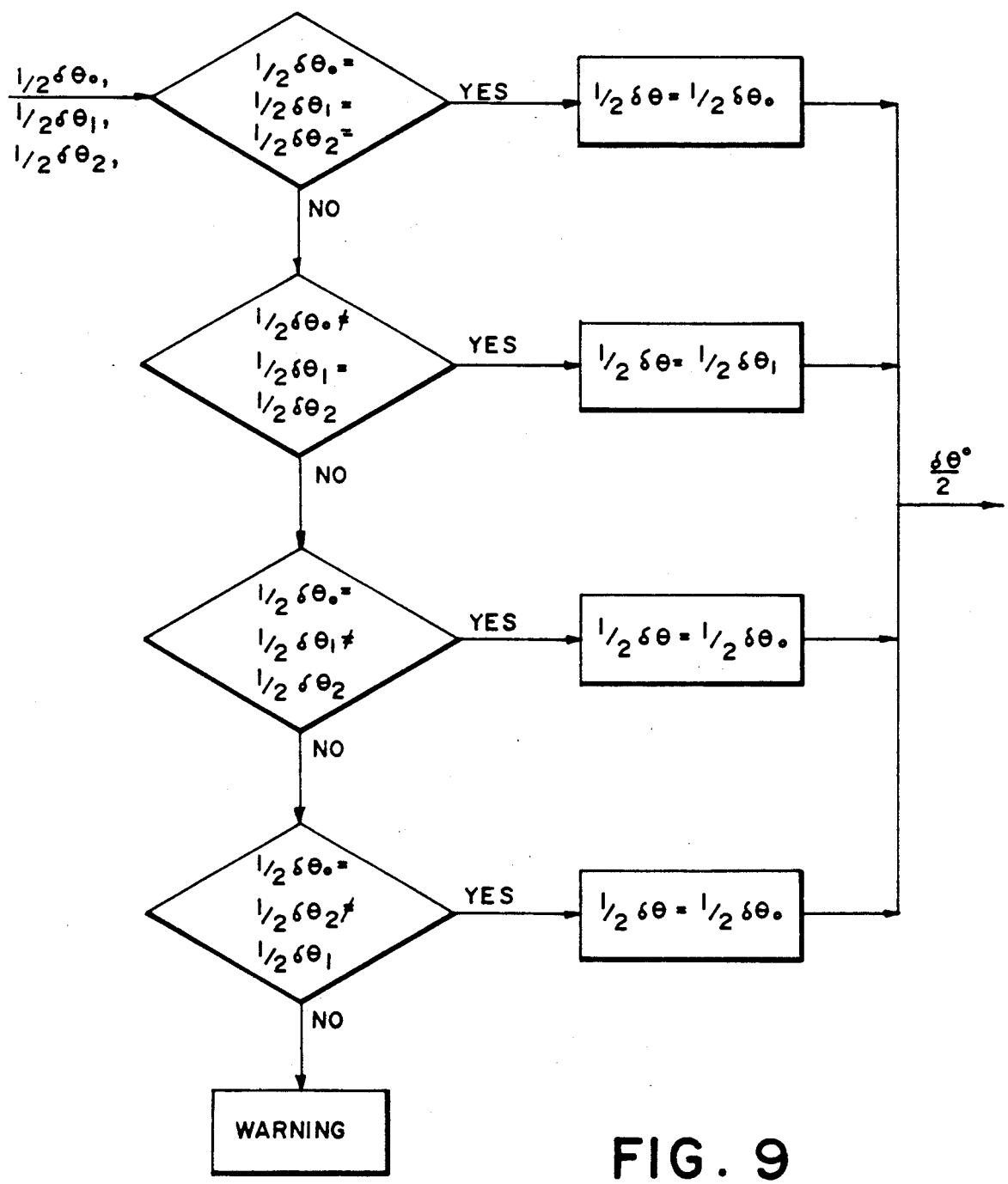
FIG. 9 is a block diagram of signal processing logic for half-angle polling, used in logic element 212 of FIG. 8.

The signal from motion sensor 201 is input to phase detector element 206 along with the signal from driver 204. Phase detector element 206 compares the two signals and produces a phase angle difference measurement between the two signals. This phase angle difference is then input to asymmetry compensation logic element 209 which processes the signal to produce an asymmetry-compensated phase angle difference between motion sensor 201 and driver 204. Similarly, the signals of motion sensor 202 and driver 204 are input to phase detector element 208 where they are processed to produce a phase angle difference, which is in turn processed by asymmetry compensation logic element 211 to produce an asymmetry-compensated phase angle difference between motion sensor 202 and driver 204. The two motion sensor 201 and 202 signals are also processed by phase detector element 207 to produce a phase angle difference measurement, which is then input to divider element 210 where the phase angle difference signal is divided by 2. The three signals from asymmetry compensation logic elements 209 and 211 and divider element 210, which are each half-angle measurements, are then input to half-angle logic element 212 where they are compared according to a polling scheme, shown in FIG. 9. The purpose of the polling scheme is to determine if there is a zero fluctuation of the flow conduit, which would be indicative of unbalanced operation.

A half-angle difference is output by half-angle logic element 212, which is then input to half-angle tangent function logic element 214, which processes the signal to produce a half-angle tangent function signal. The measured drive frequency, processed frequency response function, processed half-angle tangent function, and temperature-compensated Coriolis spring constant are combined with calibration constants in mathematics logic element 216. The output signal of mathematics logic element 216 is the mass flow rate, also according to the formula of equation (71). This embodiment has several advantages. It takes into account both the nonlinearities accounted for in the previous embodiment and asymmetries of the zero-crossings of the motion sensor signals. In addition, logic element 212 provides a warning when the device experiences unbalanced operation such as might be caused by ambient vibrations.

This second embodiment offers yet another advantage in determining the proper operation of a mass flow meter measuring the asymmetry, $\epsilon$, of motion signals versus the driver signal of two motion sensors located essentially equidistant from the driver, which should result in the same value of $\epsilon$. If the values are not the same, then there is a problem with either the sensors or the conduit and a warning signal can be provided.

Figure 10:
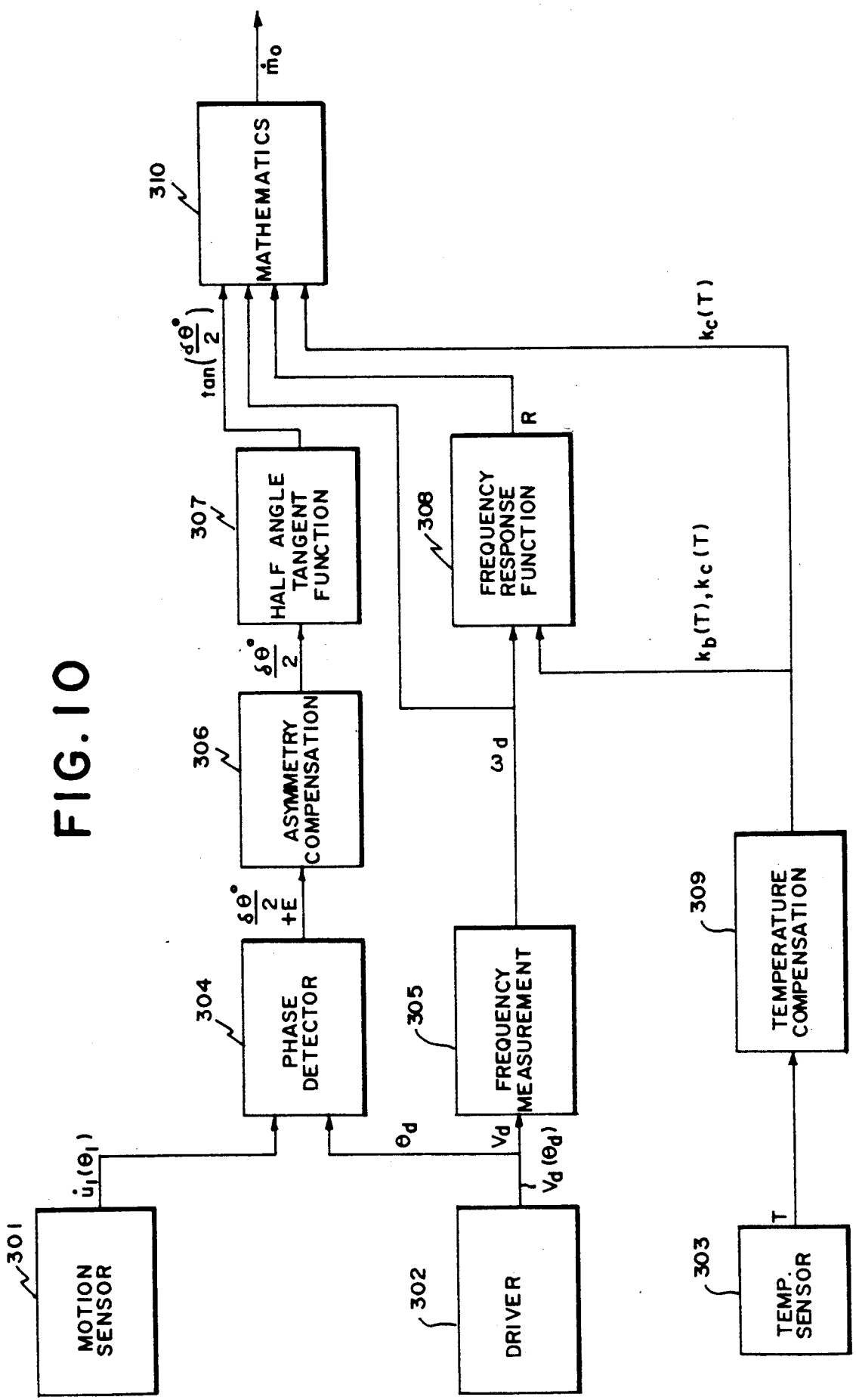
FIG. 10 is a block diagram of signal processing logic for an embodiment of the invention of an asymmetric nonlinear signal processing approach incorporated in a mass flow meter using one motion sensor to measure mass flow rate.

A third preferred embodiment of the signal processing logic for a mass flow meter, illustrated in FIG. 10 processes the signals from motion sensor 301, driver 302 and temperature sensor 303 to produce mass flow rate. The voltage sign $V_d$, having associated phase angle $\theta_d$, controlling driver 302 is input to a frequency measurement element 305 which processes the signal and outputs a driver frequency. Alternatively, a driver motion sensor can be used and such motion signal be converted to a frequency signal. This driver frequency output is input to mathematics logic element 310 and to a frequency response function logic element 308. Temperature sensor 303 is employed to provide a temperature of the oscillating flow conduit. This temperature measurement is input to temperature-compensation logic element 309, which processes the signal to produce two temperature-compensated spring constant signals. One spring constant signal, $k_b(T)$, is for the oscillation degree of freedom. The other, $k_c(T)$, is for the Coriolis degree of freedom. Both temperature-compensated spring constant signals are input to frequency response function element 308, which combines these signals. The driver 302 signal is also input to phase detector element 304, which compares this signal with the motion signal $\dot{u}_1$, having associated phase angle $\theta_1$, from the flow conduit motion sensor 301. The output from phase detector element 304 is then input to asymmetry compensation logic element 306. The resulting processed signal is input to a half-angle tangent function logic element 307. The outputs of the half-angle tangent function logic element 307, the frequency response function logic element 308 and the temperature-compensated spring constant are combined with calibration constants in mathematics logic element 310. The resulting output of the processed signals from the driver and flow conduit motion sensor is the mass flow rate, according to the formula of equation (71). This embodiment takes account of both nonlinearity and asymmetry, as in the previous embodiment, but has the further advantage of requiring only one motion sensor signal, in addition to the driver signal.

In the fourth, fifth and sixth embodiments which follow, a damping measurement is employed. It is contemplated that several techniques can be used for making damping measurements. For many applications the damping is constant, and very accurate modal analysis techniques can be employed. For example, the Modal 3.0 software produced by Structural Measurement Systems, Inc. of San Jose, Calif. has been used to measure the damping ratios of mass flow meters.

When the damping is not constant, a near continuous signal must be supplied. One technique is to monitor the power delivered by the drive system. This quantity is directly proportional to the damping in the system. Small changes in the drive frequency could also be used to make damping measurements. Another approach is to use standard decay techniques, such as described in the "Shock and Vibration Handbook", second edition, 1976, published by McGraw Hill Book Company. The measurement could be made on an intermittent basis so as not to interfere with the mass flow measurement.

A fourth preferred embodiment of the signal processing logic for a mass flow meter, illustrated in FIG. 11 processes the signals from motion sensor 401, driver 402 and temperature sensor 403 to produce mass flow rate. The voltage signal $V_d$, having associated phase angle $\theta_d$, controlling driver 402 is input to a frequency measurement element 405 which processes the signal and outputs a driver frequency. Alternatively, a driver motion sensor can be used and such motion signal be converted to a frequency signal. This driver frequency output is input to mathematics logic element 410 and to a frequency response function logic element 408. Temperature sensor 403 is employed to provide a temperature of the oscillating flow conduit. This temperature measurement is input to temperature-compensation logic element 409, which processes the signal to produce two temperature-compensated spring constant signals. One spring constant signal $k_b(T)$, is for the oscillation degree of freedom. The other, $k_c(T)$, is for the Coriolis degree of freedom. The Coriolis spring constant $k_c(T)$ is also input to mathematics logic element 410. The driver 402 signal is also input to damping measurement element 406. The output from damping measurement element 406 is then input to the frequency response element 408. Both temperature-compensated spring constant signals are input to frequency response logic element 408, which combines these signals with the driver frequency and damping measurement to determine a frequency response function which accounts for any change in fluid density. Frequency response element 408 supplies a Coriolis phase angle function $\phi_c$ to trigonometric function element 407 and a frequency response function to mathematics logic element 410. The driver 402 signal is also input to phase detector element 404, which compares this signal with the motion signal $\dot{u}_1$, having associated phase angle $\phi_1$, from the flow conduit motion sensor 401. The output from phase detector element 404 is then input to a trigonometric function logic element 407. The outputs of the trigonometric function logic element 407, the frequency response function logic element 408 and the temperature-compensated spring constant are combined with calibration constants in mathematics logic element 410. The resulting output of the processed signals from the driver and flow conduit motion sensor is the mass flow rate, according to the formula of equation (88). This embodiment takes account of both nonlinearity and viscous damping as in the previous embodiment and has the advantage of requiring only one motion sensor signal, in addition to the driver signal.

A fifth preferred embodiment of the signal processing logic for a mass flow meter, illustrated in FIG. 12 processes the signals from motion sensor 501, driver 502 and temperature sensor 503 to produce mass flow rate according to equation (74). The voltage signal $V_d$, having associated phase angle $\phi_d$, controlling driver 502 is input to a frequency measurement element 505 which processes the signal and outputs a driver frequency $\omega_d$. Alternatively, a driver motion sensor can be used and such motion signal be converted to a frequency signal. This driver frequency output is input to mathematics logic element 510 and to a frequency response logic element 508. Temperature sensor 503 is employed to provide a temperature of the oscillating flow conduit. This temperature measurement is input to temperature-compensation logic element 509, which processes the signal to produce two temperature-compensated spring constant signals. One spring constant signal, $k_b(T)$, is for the oscillation degree of freedom. The other $k_c(T)$, is for the Coriolis degree of freedom. The driver voltage signal $V_d$ is also input to a damping measurement element 511. The output of the damping measurement element 511 is fed to the frequency response function element 508. Both temperature-compensated spring constant signals are input to frequency response logic element 508, which combines these signals with the driver frequency and damping measurement to determine a frequency response function which accounts for any change in fluid density. Frequency response function element 508 generates Coriolis phase angle function $\phi_c$ which is input to asymmetry compensation logic element 506 and also to mathematics element 510 along with a frequency response function R. The driver 502 signal is also input to phase detector element 504, which compares this signal with the motion signal $\dot{u}_1$, having associated phase angle $\phi_1$, from the flow conduit motion sensor 501. The output from phase detector element 504 is then input to asymmetry compensation logic element 506. Asymmetry compensation logic element 506 employs eqs. 89 or 90. The resulting processed signal is input to a half-angle tangent function logic element 507. The outputs of the half-angle tangent function logic element 507, the frequency response function logic element 508 and the temperature-compensated spring constant are combined with calibration constants in mathematics logic element 510. The resulting output of the processed signals from the driver and flow conduit motion sensor is the mass flow rate, according to the formula of equation (74). This embodiment takes account of asymmetry and viscous damping effects.

FIG. 13 depicts a sixth preferred embodiment of the signal processing logic for a mass flow meter which includes two motion sensors 601 and 602 positioned essentially equidistant from the center of the flow conduit to monitor the motion of two sides of the oscillating flow conduit. Driver 604 voltage signal $V_d$ is input to frequency measurement element 605 to determine the frequency at which the oscillating flow conduit is driven. This drive frequency is input to frequency response function element 609. The drive frequency is also input to mathematics logic element 611 for further processing. The driver 604 voltage signal is also input to damping measurement element 606, which generates a damping ratio $\zeta_c$ which is input to frequency response function element 609. Frequency response function element 609 generates a frequency response function R and a Coriolis phase angle function $\phi_c$ which are input to mathematics logic element 611. The Coriolis phase angle function $\phi_c$ is also input to asymmetry compensation logic element 610. Temperature sensor 603 is employed to provide a temperature of the oscillating flow conduit. This temperature measurement is input to temperature-compensation logic element 612, which processes the signal to produce two temperature-compensated spring constant signals. One spring constant signal $k_b(T)$, is for the oscillation degree of freedom. The other, $k_c(T)$, is for the Coriolis degree of freedom. Both temperature-compensated spring constant signals are input to frequency response function logic element 609, which combines these signals with the drive frequency and damping measurement to determine a frequency response function which accounts for any change in fluid density and for viscous damping. The Coriolis spring constant is also input to mathematics logic element 611. The signals $\dot{u}_1$ and $\dot{u}_2$ from each of the motion sensors 601 and 602, which have associated respective phase angles $\phi_1$ and $\phi_2$, are input to phase detector element 607 which determines the phase angle difference between the two signals. The phase angle difference is then processed by asymmetry compensation logic element 610 which combines this signal with the Coriolis phase angle function. Asymmetry compensation logic element 610 employs eq. 95. The result of this processing is input to mathematics logic element 611 for further processing. The measured drive frequency, processed frequency response function, processed half-angle tangent function and temperature-compensated Coriolis spring constant are combined with calibration constants in mathematics logic element 611 according to the formula of equation (74) to produce the mass flow rate as an output. As one skilled in the art will recognize, this embodiment takes into account inherent nonlinear effects in measuring mass flow rates along with asymmetry and viscous damping effects, which are not accounted for in the existing embodiments. Such inherent nonlinear, asymmetric and viscous damping effects are reflected in the relationship between mass flow rate and phase angle in equation (74) and are embodied in the system of FIG. 13.

It should be noted that for multiple motion sensors, the frequency of oscillation can be extracted and averaged to give a system-averaged frequency of oscillation. Similarly, for multiple tube mass flow meters, the frequency signals from the multiple tubes can be compared and if the frequencies are not within predetermined limits, a warning signal can be given.

The above discussion and related illustrations of the present invention are directed primarily to preferred embodiments and practices of the invention. However, it is believed that numerous changes and modifications in the actual implementation of the concepts described herein will be apparent to those skilled in the art, and it is contemplated that such changes and modifications may be made without departing from the scope of the invention as defined by the following claims.

We claim:

1. A flow meter for flowable materials comprising:
  a. a support;
  b. a continuous conduit which
     (1) is free of pressure sensitive joints,
     (2) is solidly mounted to said support at an inlet end and an outlet end of said conduit,
     (3) is characterized by the presence of an oscillation axis and a second axis, substantially transverse to said oscillation axis, about which Coriolis force acts when fluid is flowing through said conduit under oscillation conditions;
  c. driver means for oscillating said conduit about said oscillation axis; and
  d. sensor means for measuring motion of said conduit as a result of elastic deformation of said conduit around said second axis thereof upon oscillation of said conduit with fluid flow therethrough, thereby providing motion signals;
  e. signal processing means, comprising:
     (1) means for measuring frequency of oscillation of said conduit;
     (2) logic means for converting said frequency of oscillation to a frequency response function;
     (3) logic means for comparing said motion signals to determine a phase angle difference between said signals;
     (4) logic means for converting said phase angle difference to a half-angle tangent function of said phase angle difference;
     (5) logic means for mathematically combining said frequency response function, said frequency of oscillation and said half-angle tangent function with at least one calibration constant which comprise
     means to calculate mass flow rate $\dot{m}_o$ according to the formula where $$m_o = K_1 k_c R \frac{\tan(\delta\theta^*/2)}{\omega_d}$$

is a phase angle difference between output signals developed by said motion sensors
  $\tan(\delta\theta^*/2)$ is a half-angle tangent function;
  $K_1$ is a calibration constant proportional to a ratio of a bending force acting on said flow conduit to a viscous damping force acting on said flow conduit;
  $k_c$ is an elastic spring constant of said flow conduit which is fixed at constant temperature and is otherwise temperature compensated;

$$R = \sqrt{\frac{(\omega_c^2 - \omega_d^2)^2 + (2\omega_c \omega_d \zeta_c^2)}{\omega_c^2}}$$

is a frequency response function;
  $\omega_d$ is a natural frequency of said flow conduit about said oscillation axis;
  $\omega_c$ is a natural frequency of said flow conduit about said second axis,
  $\zeta_c$ is a damping coefficient about said second axis,
whereby a mass flow rate measurement is obtained.

2. A flow meter as in claim 1, wherein
  a. said sensor means comprises
     first sensor means for measuring motion of said conduit at a first location along said conduit, thereby providing a first motion signal and
     second sensor means for measuring motion of said conduit at a second location along said conduit, thereby providing a second motion signal; and
  b. in said signal processing means,
     said means for measuring frequency of oscillation of said conduit comprise
        (i) logic means for comparing said first and second motion signals to determine a phase angle difference between said signals and
        (ii) means for converting at least one of said first and second motion signals to a frequency of oscillation.

3. A flow meter as in claim 2, wherein said means for converting at least one of said first and second motion signals to a frequency of oscillation comprises
  a. means for converting said first motion signal to a first frequency of oscillation,
  b. means for converting said second motion signal to a second frequency of oscillation and
  c. logic means for averaging said first and second frequencies of oscillation.

4. A flow meter as in claim 1, wherein
  a. said sensor means comprises
     first sensor means for measuring motion of said conduit at a first location along said conduit, thereby providing a first motion signal and
     second sensor means for measuring motion of said conduit at a second location along said conduit, thereby providing a second motion signal;
  b. in said signal processing means
     (1) the means for measuring frequency of oscillation of said conduit comprise
        (i) sensor means for detecting a driver motion signal and
        (ii) logic means for measuring a frequency of oscillation of said conduit;
     (2) the logic means for comparing said motion signals comprises logic means for comparing said first and second motion signals to determine a motion sensor phase angle difference and
     (3) the logic means for converting said phase angle difference comprises
        (i) means for dividing said motion sensor phase angle difference by 2 to produce a motion sensor phase half-angle difference,
        (ii) logic means for comparing said first motion signal and said driver motion signal to determine a first phase angle difference between said first motion signal and said driver motion signal,
        (iii) logic means for converting said first phase angle difference to a first asymmetry-compensated phase angle difference,
        (iv) logic means for comparing said second motion signal and said driver motion signal to determine a second phase angle difference between said second motion signal and said driver motion signal,
        (v) logic means for converting said second phase angle difference to a second asymmetry-compensated phase angle difference,
        (vi) logic means for comparing said motion sensor phase half-angle difference, said first asymmetry-compensated angle difference and said second asymmetry-compensated phase angle difference to produce a system phase half-angle difference and (vii) logic means for converting said system phase half-angle difference to a half-angle tangent function.

5. A flow meter as in claim 4, wherein
a. Said logic means for converting said first phase angle difference to a first asymmetry-compensated phase angle difference comprises means for converting according to the formula $$\tan\delta\theta_R = \frac{\tan(\delta\theta_1/2)\cos\phi_c}{1 - \tan(\delta\theta_1/2)\sin\phi_c};$$

b. Said logic means for converting said second phase angle difference to a second asymmetry-compensated phase angle difference comprises means for converting according to the formula $$\tan\delta\theta_L = \frac{\tan(\delta\theta_2/2)\cos\phi_c}{1 + \tan(\delta\theta_2/2)\sin\phi_c};$$

where
$\delta\theta_R$ is said first phase angle difference,
$\delta\theta_1$ is said first asymmetry-compensated phase angle difference,
$\phi_c$ is a Coriolis phase angle function,
$\delta\theta_L$ is said second phase angle difference, and
$\delta\theta_2$ is said second asymmetry-compensated phase angle difference; and c. Said logic means for comparing said motion sensor phase half-angle difference, [$\frac{1}{2}\delta\theta_c$,] said first asymmetry-compensated phase angle difference and said difference and said second asymmetry-compensated phase angle difference, to produce a system phase half-angle difference comprises means to do so according to the relationships (1) if $\frac{1}{2}\delta\theta_o = \frac{1}{2}\delta\theta_1 = \frac{1}{2}\delta\theta_2$, then $\frac{1}{2}\delta\theta^* = \frac{1}{2}\delta\theta_o$, (2) if $\frac{1}{2}\delta\theta \neq \frac{1}{2}\delta\theta_1 = \frac{1}{2}\delta\theta_2$, then $\frac{1}{2}\delta\theta^* = \frac{1}{2}\delta\theta_1$, (3) if $\frac{1}{2}\delta\theta = \frac{1}{2}\delta\theta_1 \neq \frac{1}{2}\delta\theta_2$, then $\frac{1}{2}\delta\theta^* = \frac{1}{2}\delta\theta_o$, (4) if $\frac{1}{2}\delta\theta = \frac{1}{2}\delta\theta_2 \neq \frac{1}{2}\delta\theta_1$, then $\frac{1}{2}\delta\theta^* = \frac{1}{2}\delta\theta_o$, whereby lack of agreement with b(1) through b(4) produces a warning signal.

6. A flow meter as in claim 1, wherein, in said signal processing means,
a. the means for measuring frequency of oscillation of said conduit comprises
  (i) sensor means for detecting a driver motion signal and
  (ii) logic means for measuring a frequency of oscillation of said conduit;
b. the logic means for comparing said motion signals comprises means for comparing at least one of said motion signals and said driver motion signal to determine a phase angle difference between said motion signal and said driver motion signal;
c. the logic means for converting said phase angle difference comprises (i) means for converting said phase angle difference to an asymmetry-compensated half-angle difference and (ii) logic means for converting said asymmetry-compensated phase half-angle difference to a half-angle tangent function.

7. A flow meter as in claim 1, further comprising:
a. temperature sensor means for measuring conduit temperature, thereby providing a temperature signal and
b. logic means for converting said temperature signal to at least one temperature compensated spring constant signal,
Wherein
said logic means for mathematically combining said frequency response function, said frequency, and said half-angle tangent function with at least one calibration constant comprises means which also mathematically combine said temperature compensated spring constant signal therewith,
thereby producing a mass flow rate measurement.

8. A flow meter as in claim 1, further comprising:
a. temperature sensor means for measuring conduit temperature, thereby providing a temperature signal;
b. logic means for converting said temperature signal to a temperature compensated spring constant representing the oscillation degree of freedom of said conduit and corresponding to conduit motion about said oscillation axis;
c. logic means for converting said temperature signal to a temperature-compensated spring constant representing the Coriolis degree of freedom of said conduit and corresponding to conduit motion about said second axis;
d. logic means for converting said temperature-compensated spring constant representing the oscillation degree of freedom and said frequency of oscillation of said conduit to a fluid density;
e. logic means for converting said temperature-compensated spring constant representing the Coriolis degree of freedom of said conduit and said fluid density to a Coriolis natural frequency;
f. logic means for converting said Coriolis natural frequency and said frequency of oscillation to a frequency response function, thereby correcting for density variations; wherein
g. the logic means for mathematically combining said frequency, said frequency response function and said half-angle tangent function with at least one calibration constant comprise means which also mathematically combine said temperature compensated spring constant representing the Coriolis degree of freedom therewith,
thereby producing a mass flow rate measurement.

9. A flow meter for flowable materials comprising:
a. a support;
b. a continuous conduit which
  (1) is free of pressure sensitive joints,
  (2) is solidly mounted to said support at an inlet end and an outlet end of said conduit,
  (3) is characterized by the presence of an oscillation axis and a second axis, substantially transverse to said oscillation axis, about which Coriolis force acts when fluid is flowing through said conduit under oscillation conditions;
c. driver means for oscillating said conduit about said oscillation axis;
d. sensor means for measuring motion of said driver means, thereby providing a driver motion signal;

e. sensor means for measuring motion of said conduit as a result of elastic deformation of said conduit around said second axis thereof upon oscillation of said conduit with fluid flow therethrough, thereby providing motion signals; and f. signal processing means, comprising:
  (1) means for measuring frequency of oscillation of said conduit;
  (2) logic means for converting said driver motion signal to a damping measurement;
  (3) logic means for converting said frequency of oscillation and said damping measurement to a frequency response function and a Coriolis phase angle function;
  (4) logic means for comparing said driver motion signal and at least one of said flow conduit motion signals to determine a phase angle difference between said signals;
  (5) logic means for converting said phase angle difference and said Coriolis phase angle function to a trigonometric function of said phase angle difference;
  (6) logic means for mathematically combining said frequency response function, said frequency of oscillation and said trigonometric function with at least one calibration constant; thereby producing a mass flow rate measurement.

10. A flow meter as in claim 9, wherein said logic means for mathematically combining said frequency response function, said frequency of oscillation, and said trigonometric function comprises logic means which further mathematically combines therewith said damping measurement, to calculate mass flow rate $\dot{m}_o$ according to the formula $$\dot{m}_o = K_1 k_c R \frac{1}{\omega_d} \frac{\sin\delta\theta}{\cos(\delta\theta - \phi_c)}$$

where $\delta\theta$ is a phase angle difference between output signals developed by said driver and flow conduit motion sensors;

$\phi_c$ is a Coriolis phase angle function $\frac{\sin\delta\theta}{\cos(\delta\theta - \phi_c)}$ is a trigonometric function;

$K_1$ is a calibration constant proportional to a ratio of a bending force acting on said flow conduit to a viscous damping force acting on said flow conduit;

$k_c$ is an elastic spring constant of said flow conduit which is fixed at constant temperature and otherwise is temperature-compensated.

$R = \frac{\sqrt{(\omega_c^2 - \omega_d^2)^2 + (2\omega_c\omega_d\zeta_c)^2}}{\omega_c^2}$ is a frequency response function;

$\omega_d$ is a natural frequency of said flow conduit about said oscillation axis;

$\omega_c$ is a natural frequency of said flow conduit about said second axis;

$\zeta_c$ is a damping coefficient about said second axis.

11. A flow meter as in claim 9, further comprising:
a. temperature means for measuring conduit temperature, thereby providing a temperature signal and
b. logic means for converting said temperature signal to at least one temperature-compensated spring constant, wherein
c. said logic means for mathematically combining said frequency response function, said frequency, and said trigonometric function, with at least one calibration constant comprises means which also mathematically combine said temperature-compensated spring constant therewith,
thereby producing a mass flow rate measurement.

12. A flow meter as in claim 9, further comprising:
a. temperature sensor means for measuring conduit temperature, thereby providing a temperature signal,
b. logic means for converting said temperature signal to a temperature-compensated spring constant representing the oscillation degree of freedom of said conduit and corresponding to conduit motion about said oscillation axis,
c. logic means for converting said temperature signal to a temperature-compensated spring constant representing the Coriolis degree of freedom of said conduit and corresponding to conduit motion about said second axis,
d. logic means for converting said temperature-compensated spring constant representing the oscillation degree of freedom of the conduit and said frequency oscillation to a fluid density,
e. logic means for converting said temperature-compensated spring constant representing the Coriolis degree of freedom of said conduit and said fluid density to a Coriolis natural frequency and
f. logic means for converting said Coriolis natural frequency, said frequency of oscillation and said damping measurement to a frequency response function, thereby correcting for density variations; wherein
g. the logic means for mathematically combining said frequency response function, said frequency and said trigonometric function with at least one calibration constant comprises means which also mathematically combine therewith said temperature compensated spring constant representing the Coriolis degree of freedom, thereby producing a mass flow rate measurement.

13. A flow meter for flowable materials comprising:
a. a support;
b. a continuous conduit which
  (1) is free of pressure sensitive joints,
  (2) is solidly mounted to said support at an inlet end and an outlet end of said conduit,
  (3) is characterised by the presence of an oscillation axis and a second axis, substantially transverse to said oscillation axis, about which Coriolis force acts when fluid is flowing through said conduit under oscillation conditions;
c. driver means for oscillating said conduit about said oscillation axis;
d. sensor means for measuring motion of said driver means, thereby providing a driver motion signal;

e. sensor means for measuring motion of said conduit as a result of elastic deformation of said conduit around said second axis thereof upon oscillation of said conduit with fluid flow therethrough, thereby providing motion signals; and f. signal processing means, comprising:
   (1) means for measuring frequency of of oscillation of said conduit;
   (2) logic means for converting said driver motion signal to a damping measurement;
   (3) logic means for converting said damping measurement and said frequency of oscillation to a frequency response function and a Coriolis phase angle function;
   (4) logic means for comparing said driver motion signal and one of said flow conduit motion signals to determine a phase angle difference between said signals;
   (5) logic means for converting said phase angle difference and said Coriolis phase angle function to an asymmetry-compensated half-angle function;
   (6) logic means for converting said asymmetry-compensated half-angle function to a half-angle tangent function;
   (7) logic means for mathematically combining said frequency response function, said frequency of oscillation and said half-angle tangent function with at least one calibration constant; thereby producing a mass flow rate measurement.

14. A flow meter as in claim 13, wherein said logic means for mathematically combining said frequency response function, said frequency of oscillation, and said half-angle tangent function comprises means to calculate mass flow rate $\dot{m}_o$ according to the formula.

$$\dot{m}_o = K_1 k_c R \frac{\tan(\delta\theta^o/2)\cos\phi_c}{\omega_d}$$

where $\delta\theta$ is a phase angle difference between output signals developed by said driver and flow conduit motion sensors;

$\delta\theta^o$ is a phase angle difference between output signals developed by said and flow conduit motion sensors when said motion is undamped;

$\phi_c$ is a Coriolis phase angle function;

$$\frac{\tan\delta\theta^o}{2} = \frac{\tan\delta\theta}{\cos^2\phi_c + \tan\delta\theta\cos\phi_c}$$ is a half angle tangent function for undamped motion;

$K_1$ is a calibration constant proportional to a ratio of a bending force acting on said flow conduit to a viscous damping force acting on said flow conduit;

$k_c$ is an elastic spring constant of said flow conduit which is fixed at constant temperature and otherwise must be temperature compensated;

$$R = \frac{\sqrt{(\omega_c^2 - \omega_d^2)^2 + (2\omega_c\omega_d\zeta_c)^2}}{\omega_c^2}$$ is a frequency response function;

-continued $\omega_d$ is a natural frequency of said flow conduit about said oscillation axis;

$\omega_c$ is a natural frequency of said flow conduit about said second axis;

$\zeta_c$ is a damping coefficient about said second axis.

15. A flow meter as in claim 13, further comprising:
(a) temperature sensor means for measuring conduit temperature, thereby providing a temperature signal and
(b) logic means for converting said temperature signal to at least temperature compensated spring constant; wherein
(c) said logic means for mathematically combining said frequency response function, said frequency, and said half angle tangent function with at least one calibration constant comprises means which also mathematically combine said temperature compensated spring constant therewith, thereby producing a mass flow rate measurement.

16. A flow meter as in claim 13, further comprising:
a. temperature sensor means for measuring conduit temperature, thereby providing a temperature signal;
b. logic means for converting said temperature signal to a temperature compensated spring constant representing the oscillation degree of freedom of said conduit and corresponding to conduit motion about said oscillation axis;
c. logic means for converting said temperature signal to a temperature-compensated spring constant representing the Coriolis degree of freedom of said conduit and corresponding to conduit motion about said second axis;
d. logic means for converting said frequency and said temperature-compensated spring constant representing the oscillation degree of freedom to a fluid density;
e. logic means for converting said temperature compensated spring constant representing the Coriolis degree of freedom and said fluid density to a Coriolis natural frequency; and
f. logic means for converting said coriolis natural frequency, said frequency of oscillation and said damping measurement to a frequency response function, thereby correcting for density variations; wherein
g. said logic means for mathematically combining said frequency response function, said frequency and said half-angle tangent function with at least one calibration constant comprises means which also mathematically combine said coriolis spring constant therewith thereby producing a mass flow rate measurement.

17. A flow meter for flowable materials comprising:
a. a support;
b. a continuous conduit which,
   (1) is free of pressure sensitive joints,
   (2) is solidly mounted to said support at an inlet end and an outlet end of said conduit,
   (3) is characterized by the presence of an oscillation axis and a second axis, substantially transverse to said oscillation axis, about which Coriolis force acts when fluid is flowing through said conduit under oscillation conditions;

c. driver means for oscillating said conduit about said oscillation axis;

d. sensor means for measuring motion of said driver means, thereby providing a driver motion signal;

e. sensor means for measuring motion of said conduit as a result of elastic deformation of said conduit around said second axis thereof upon oscillation of said conduit with fluid flow therethrough, thereby providing motion signals; and f. signal processing means, comprising:
  (1) means for measuring frequency of oscillation of said conduit;
  (2) logic means for converting said driver motion signal to a damping measurement;
  (3) logic means for converting said frequency of oscillation and said damping measurement to a frequency response function;
  (4) logic means for comparing said motion signals to determine a phase angle difference between said signals;
  (5) logic means for converting said phase angle difference to a half-angle tangent function of said phase angle difference;
  (6) logic means for mathematically combining said frequency response function, said frequency of oscillation and said half-angle tangent function with at least one calibration constant; thereby producing a mass flow rate measurement.

18. A flow meter as in claim 17, wherein said logic means for mathematically combining said frequency response function, said frequency of oscillation, and said half-angle tangent function with at least one calibration constant comprises means to calculate mass flow rate $\dot{m}_o$ according to the formula $$\dot{m}_o = K_1 k_c R \frac{\tan(\delta\theta^o/2)}{\omega_d} \cos\phi_c$$

where $\delta\theta^o$ is a phase angle difference between output signals developed by said motion sensors for undamped motion;

$\phi_c$ is a Coriolis phase angle function;

$\delta\theta_1$ is a phase angle difference between one motion sensor and the flow conduit midpoint;

$\delta\theta_2$ is a phase angle difference between the other motion sensor and the flow conduit midpoint;

$$\tan\left(\frac{\delta\theta^o}{2}\right) = \frac{\sqrt{1 + \tan^2(\delta\theta_1 + \delta\theta_2)\sec^2\phi_c} - 1}{\tan(\delta\theta_1 + \delta\theta_2)}$$

is a half angle tangent function;

$K_1$ is a calibration constant proportional to a ratio of a bending force acting on said flow conduit to a viscous damping force acting on said flow conduit;

$k_c$ is an elastic spring constant of said flow conduit which is fixed at constant temperature but otherwise must be temperature compensated;

$$R = \frac{\sqrt{(\omega_c^2 - \omega_d^2)^2 + (2\omega_c\omega_d\zeta_c)^2}}{\omega_c^2}$$ is a frequency response function;

$\omega_d$ is a natural frequency of said flow conduit about said oscillation axis;

$\omega_c$ is a natural frequency of said flow conduit about said second axis;

$\zeta_c$ is a damping coefficient about said second axis.

19. A flow meter as in claim 17 wherein said sensor means for measuring motion of the conduit comprise
  (1) first sensor means for measuring motion of said conduit at a first location along said conduit, thereby providing a first motion signal and
  (2) second sensor means for measuring motion of said conduit at a second location along said conduit, thereby providing a second motion signal.

20. A flow meter as in claim 17, further comprising:
a. temperature sensor means for measuring conduit temperature, thereby providing a temperature signal and
b. logic means for converting said temperature signal to a at least one temperature compensated spring constant, wherein
c. said logic means for mathematically combining said frequency response function, said frequency, and said half-angle tangent function with at least one calibration constant comprise means for also combining said temperature compensated spring constant therewith, thereby producing a mass flow rate measurement.

21. A flow meter as in claim 17, further comprising:
a. temperature sensor means for measuring conduit temperature, thereby providing a temperature signal;
b. logic means for converting said temperature signal to a temperature compensated spring constant representing the oscillation degree of freedom of said conduit and corresponding to conduit motion about said oscillation axis;
c. Logic means for converting said temperature signal to a temperature compensated spring constant representing the Coriolis degree of freedom of said conduit and corresponding to conduit motion about said second axis;
d. logic means for converting said temperature compensated spring constant representing the oscillation degree of freedom and said frequency of oscillation to a fluid density;
e. logic means for converting said temperature compensated spring constant representing the Coriolis degree of freedom and said fluid density to a Coriolis natural frequency;
f. logic means for converting said Coriolis natural frequency, said frequency of oscillation and said damping measurement to a frequency response function, thereby correcting for density variations and wherein
g. said logic means for mathematically combining said frequency, said frequency response function and said half-angle tangent function with at least one calibration constant comprise means for also combining said temperature compensated spring constant representing the Coriolis degree of freedom therewith, thereby producing a mass flow rate measurement.

* * * * *